US012700824B2

(12) United States Patent
Mouniandy et al.

(10) Patent No.: US 12,700,824 B2
(45) Date of Patent: Aug. 4, 2026

(54) SOLAR TRACKER SYSTEMS AND METHODS INCLUDING A RAIL ASSEMBLY

(71) Applicant: FTC Solar, Inc., Austin, TX (US)

(72) Inventors: Tamilarasan Mouniandy, Chennai (IN); Nagendra Srinivas Cherukupalli, Saratoga, CA (US); Baskaran Subbarayan, Chennai (IN); Rajesh Shanmugasundaram, Chennai (IN); Sait Abdul Kareem, Chennai (IN)

(73) Assignee: FTC Solar, Inc., Austin, TX (US)

( * ) Notice: Subject to any disclaimer, the term of this patent is extended or adjusted under 35 U.S.C. 154(b) by 3 days.

(21) Appl. No.: 18/648,622

(22) Filed: Apr. 29, 2024

(65) Prior Publication Data

US 2024/0283392 A1      Aug. 22, 2024

Related U.S. Application Data

(63) Continuation-in-part of application No. 18/058,392, filed on Nov. 23, 2022, now Pat. No. 11,984,842.

(60) Provisional application No. 63/378,209, filed on Oct. 3, 2022, provisional application No. 63/364,391, filed on May 9, 2022.

(51) Int. Cl.
H02S 20/32 (2014.01)

(52) U.S. Cl.
CPC .................................. H02S 20/32 (2014.12)

(58) Field of Classification Search
CPC ..................................................... H02S 20/32
See application file for complete search history.

(56) References Cited

U.S. PATENT DOCUMENTS

| | | |
|---|---|---|
| 2010/0243827 A1 | 9/2010 | Zante et al. |
| 2015/0092383 A1 | 4/2015 | Corio et al. |
| 2017/0063007 A1 | 3/2017 | Hudson et al. |
| 2017/0229998 A1* | 8/2017 | Molina ................... H02S 20/10 |
| 2017/0250648 A1 | 8/2017 | Haas et al. |
| 2017/0294870 A1 | 10/2017 | Almy et al. |
| 2017/0310273 A1 | 10/2017 | Almy et al. |
| 2017/0359017 A1* | 12/2017 | Corio ..................... F16M 11/18 |
| 2020/0153382 A1 | 5/2020 | Ballentine et al. |
| 2022/0014146 A1 | 1/2022 | Smiley et al. |
| 2022/0085752 A1 | 3/2022 | de Fresart |
| 2022/0193927 A1* | 6/2022 | Mazzetti, Jr. .......... B25J 9/1697 |
| 2022/0271706 A1* | 8/2022 | Creasy ................... H02S 30/10 |

(Continued)

OTHER PUBLICATIONS

International Search Report and Written Opinion of the International Search Authority issued in PCT/US2023/21173 dated May 5, 2023, pp. 1-15.

*Primary Examiner* — Jayne L Mershon
(74) *Attorney, Agent, or Firm* — Armstrong Teasdale LLP

(57) ABSTRACT

Rail assemblies for connecting a photovoltaic panel to a tube include a rail shaped to be mounted on the tube such that, when mounted, the rail extends transversely outward of the tube between first and second ends. The rail assemblies further include a rail connector for securing the rail to the tube. The rail connector includes a first clip attached to the rail, a second clip attached to the rail, and a lock bracket defining a notch shaped to releasably receive the second clip. The first clip is attached to the lock bracket. When the rail is secured to the tube, the first clip and the second clip collectively apply tension on the lock bracket to clamp the rail to the tube.

20 Claims, 32 Drawing Sheets

(56) References Cited

U.S. PATENT DOCUMENTS

2022/0325736 A1 * 10/2022 De La Fuente De Pablo ............
                                     F24S 30/425
2022/0407451 A1    12/2022 Jacobs

* cited by examiner

SOLAR TRACKER SYSTEMS AND METHODS INCLUDING A RAIL ASSEMBLY

CROSS-REFERENCE TO RELATED APPLICATION

This application is a continuation-in-part of U.S. patent application Ser. No. 18/058,392 filed Nov. 23, 2022, which claims the benefit of U.S. Provisional Patent Application No. 63/378,209 filed Oct. 3, 2022, and U.S. Provisional Patent Application No. 63/364,391 filed May 9, 2022, each of which are incorporated herein by reference in their entirety.

FIELD

The field relates generally to systems and methods for solar tracking and for securing solar photovoltaic (PV) panels on a solar array.

BACKGROUND

Solar arrays are devices that convert light energy into other forms of useful energy (e.g., electricity or thermal energy). One example of a solar array is a photovoltaic (PV) array that converts sunlight into electricity. Some photovoltaic arrays are configured to follow or track the path of the sun to minimize the angle of incidence between incoming sunlight and the photovoltaic array.

Photovoltaic arrays include a plurality of PV panels that are attached to a rotatable tube. A drive rotates the tube to move the panels when tracking the path of the sun. A support structure is generally used to mount the panels on the tube and the support structure is attached to the tube. Known attachments support structures typically use fasteners, which can increase the complexity and time for assembling the arrays. Accordingly, a need exists for systems for attaching panel support structures to the tubes which secure the panels in position on the tube against loads acting on the panels during normal use, and which may be easily installed or adjusted without the use of specialized tooling and/or loose fastening components.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a solar tracker system includes a rotatable tube defining a longitudinal axis and a rail mounted on the rotatable tube. The rail extends transversely outward of the tube between first and second opposed ends. The solar tracker system further includes a photovoltaic panel assembly attached to the rail and a rail connector securing the rail to the rotatable tube. The rail connector includes at least one clip attached to the rail and a lock bracket defining a notch receiving the clip therein such that the clip applies tension on the lock bracket.

In another aspect, a rail assembly for connecting a photovoltaic panel to a tube includes a rail shaped to be mounted on the tube such that, when mounted, the rail extends transversely outward of the tube between first and second ends. The rail assembly further includes a rail connector for securing the rail to the tube. The rail connector includes at least one clip attached to the rail and a lock bracket. The lock bracket defines a notch that is sized and shaped to receive the clip therein. When the clip is received in the notch, the clip applies tension on the lock bracket to clamp the rail connector in longitudinal position on the rail.

In yet another aspect, a method of securing a solar array includes positioning a plurality of rails on a rotatable tube that defines a longitudinal axis. The method further includes clamping each rail of the plurality of rails to the tube by attaching clips, for each rail of the plurality of rails, to a corresponding lock bracket. The lock brackets each define a notch therein that receives the corresponding clip. The clip applies tension on the lock bracket to secure the rail in longitudinal position. The method further includes installing photovoltaic panels on each rail of the plurality of rails by sliding the panels along the rails.

In yet another aspect, a rail assembly for connecting a photovoltaic panel to a tube includes a rail shaped to be mounted on the tube such that, when mounted, the rail extends transversely outward of the tube between first and second ends. The rail assembly further includes a rail connector for securing the rail to the tube. The rail connector includes a first clip attached to the rail, a second clip attached to the rail, and a lock bracket defining a notch shaped to releasably receive the second clip. The first clip is attached to the lock bracket. When the rail is secured to the tube, the first clip and the second clip collectively apply tension on the lock bracket to clamp the rail to the tube.

In yet another aspect, a solar tracker system includes a rotatable tube defining a longitudinal axis, a rail mounted on the rotatable tube extending transversely outward of the tube between first and second opposed ends, a photovoltaic panel assembly attached to the rail, and a rail connector for securing the rail to the tube. The rail connector includes a first clip attached to the rail, a second clip attached to the rail, and a lock bracket defining a notch shaped to releasably receive the second clip. The first clip is attached to the lock bracket and, when the rail is secured to the tube, the first clip and the second clip collectively apply tension on the lock bracket to clamp the rail to the tube.

In yet another aspect, a method of assembling a solar array includes positioning a rail assembly on a rotatable tube. The rail assembly includes a rail that extends transversely outward from the tube and a rail connector including first and second clips attached to the rail and a lock bracket defining a notch. The first clip is attached to the lock bracket. The method further includes clamping the rail to the tube by positioning the second clip in the notch of the lock bracket such that the first clip and the second clip collectively apply tension on the lock bracket.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1A:
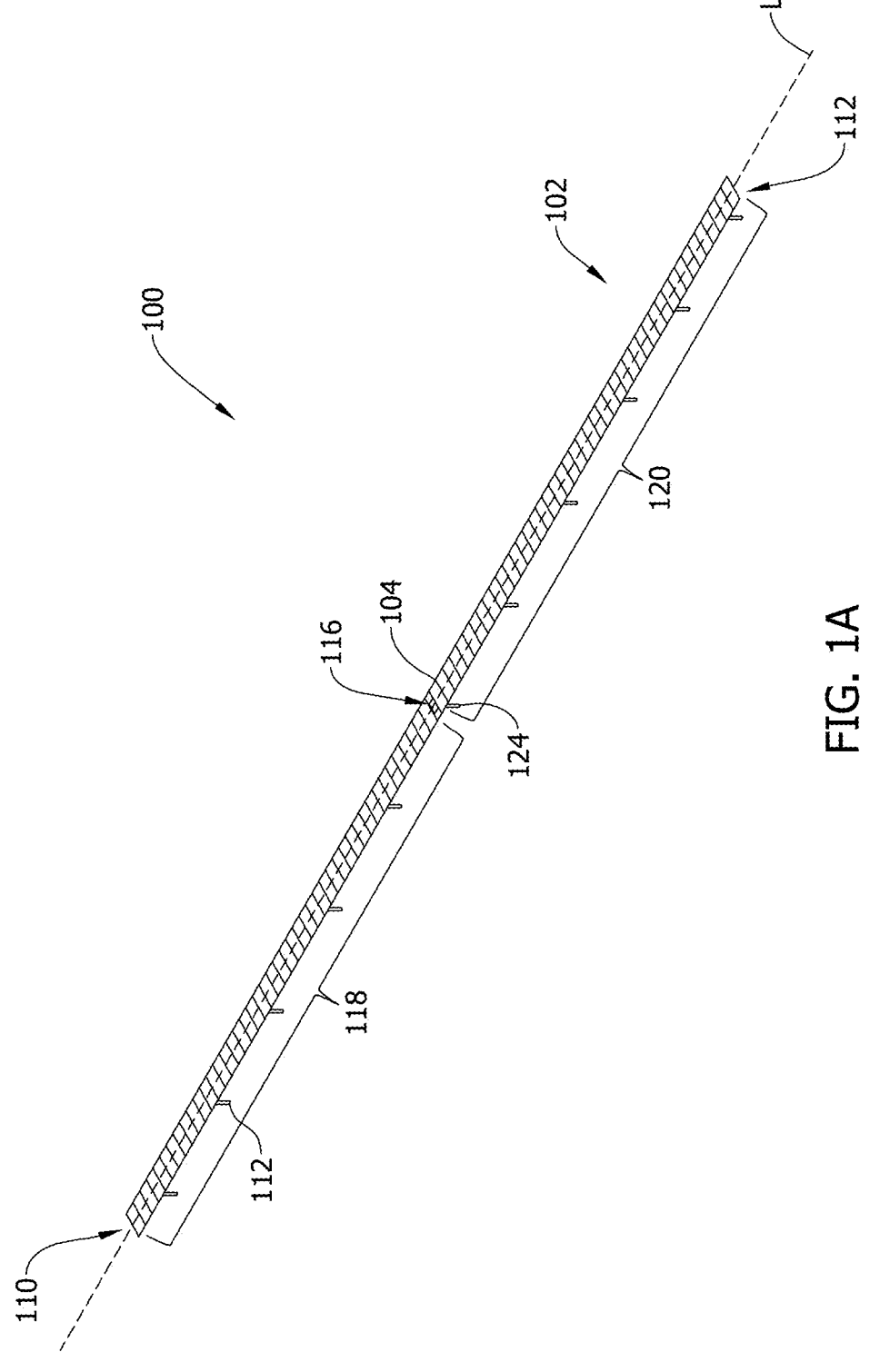
FIG. 1A is a perspective view of a solar tracker system including a solar array row.
Figure 1B:
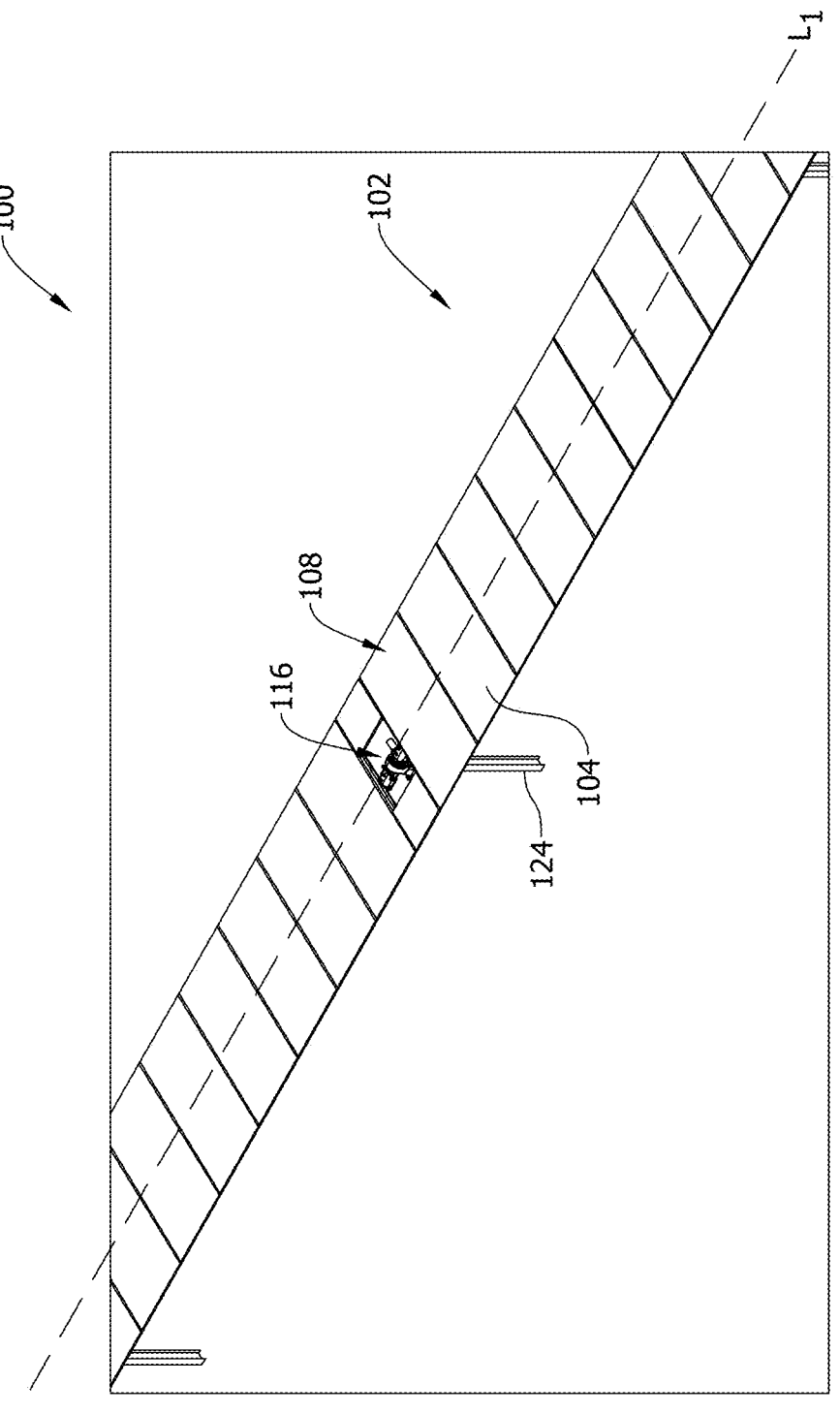
FIG. 1B is an enlarged perspective view of a portion of the solar array row of FIG. 1A.

An example solar tracker system 100 including a photovoltaic (PV) solar array row 102 (alternatively referred to herein as an "array" or a "row") is shown in FIGS. 1A and 1B. The solar tracker system 100 and array row 102 is suitably used in a solar power generation system. The solar array row 102 is used to generate power, typically in combination with a plurality of similarly arranged solar array rows 102 of the solar tracker system 100 (not all rows 102 shown). The solar array row 102 includes a plurality of solar panel assemblies 104. Each solar panel assembly 104 extends between a back or bottom side 106 (shown in FIG. 7) and a panel side 108. The solar array row 102 defines a longitudinal axis $L_1$ extending between the first and second longitudinal ends 110, 112 of the row 102.

In the embodiment of FIG. 1A, solar array row 102 is a one-panel or "1P" row 102 (terms used interchangeably herein), in that it includes a row 102 of single solar panel assemblies 104 attached to a torque tube 114 (shown in FIG. 2) sequentially along the longitudinal axis $L_1$ at a transverse midpoint of the panel assemblies 104. In other embodiments, the solar array row 102 may be a two-panel or "2P" row 102 that includes two rows 102 of panel assemblies 104 attached to the torque tube 114, and each extending in opposed directions outwards from the torque tube 114 in two rows 102 of panels.

Referring to FIG. 1A, the solar array row 102 includes a drive 116 for rotating the panel assemblies 104 about the longitudinal axis $L_1$. The solar array row 102 defines a first section 118 extending from the first end 110 of the solar array row 102 to the drive 116 and a second section 120 extending from the drive 116 to the second, opposed end 112 of the solar array row 102. The drive 116 is positioned substantially longitudinally in or near the middle of the solar array row 102. In other embodiments, the solar array row 102 may include multiple drives 116.

The solar array row 102 includes a plurality of posts 122 and the torque tube 114 (shown in FIG. 2) to which the solar panel assemblies 104 are connected. The plurality of posts 122 includes a central post 124 that supports the drive 116. The torque tube 114 is rotatably connected to each of the posts 122 to enable rotation of the solar panel assemblies 104 about the longitudinal axis $L_1$. As shown, the posts 122 are suitably I-beam posts but other types of posts may be used. In the example, the solar array row 102 includes 11 posts 122, including the central post 124 and ten additional posts 122 that are symmetrically arranged on opposed sides of the central post 124. In other embodiments, the solar array row 102 may include any suitable number of posts 122.

The posts 122 may be connected to a base (not shown) for securing the row 102 in a solar array field or any other suitable tracking environment. Generally, the base may include any structure that anchors the row 102, for example a stanchion, ram, pier, ballast, post or the like. The base may also include a foundation that encases a portion of the posts 122 or may include brackets, fasteners or the like that connect to the posts 122. In other embodiments, the row 102 may be connected to another structure that supports the solar panel assemblies 104 (e.g., roof-top applications).

The solar panel assemblies 104 of this embodiment are a photovoltaic (PV) array. In other embodiments, the solar panel assemblies 104 may include a thermal collector that heats a fluid such as water. In such embodiments, the panel assemblies 104 may include tubes of fluid (not shown) which are heated by solar radiation. While the present disclosure may describe and show a photovoltaic array, the principles disclosed herein are also applicable to a solar array configured as a thermal collector unless stated otherwise.

The drive 116 is selectively controllable to rotate the torque tube 114 such that the panel assemblies 104 follow the path of the sun, such as during movement of the sun over a course of a day. For example, the drive 116 rotates the panel assemblies 104 such that a plane of array (i.e., a plane that is coplanar with the panel side 108 of the panel assemblies) is substantially perpendicular to a direction of sunlight directed at the panels throughout the day. In some methods, the panel assemblies 104 are positioned based on seasonal variations in the position of the sun. The solar array row 102 may be a single axis tracker or a dual axis tracker with the torque tube 114 defining at least one axis of rotation of the array 102. The other axis of rotation may be a vertical axis with rotation being achieved by a rotatable coupling and, optionally, a second drive 116 (not shown).

The solar array row 102 further includes a row controller (not shown) for controlling operation of the drive 116. The row controller is a portable controller which may be removably attached to the solar array row 102, near the drive 116. The controller may be used on other tracker systems, including tracker systems that have a different configuration of panels (e.g., 2P systems) and/or number of posts 122.

Figure 2:
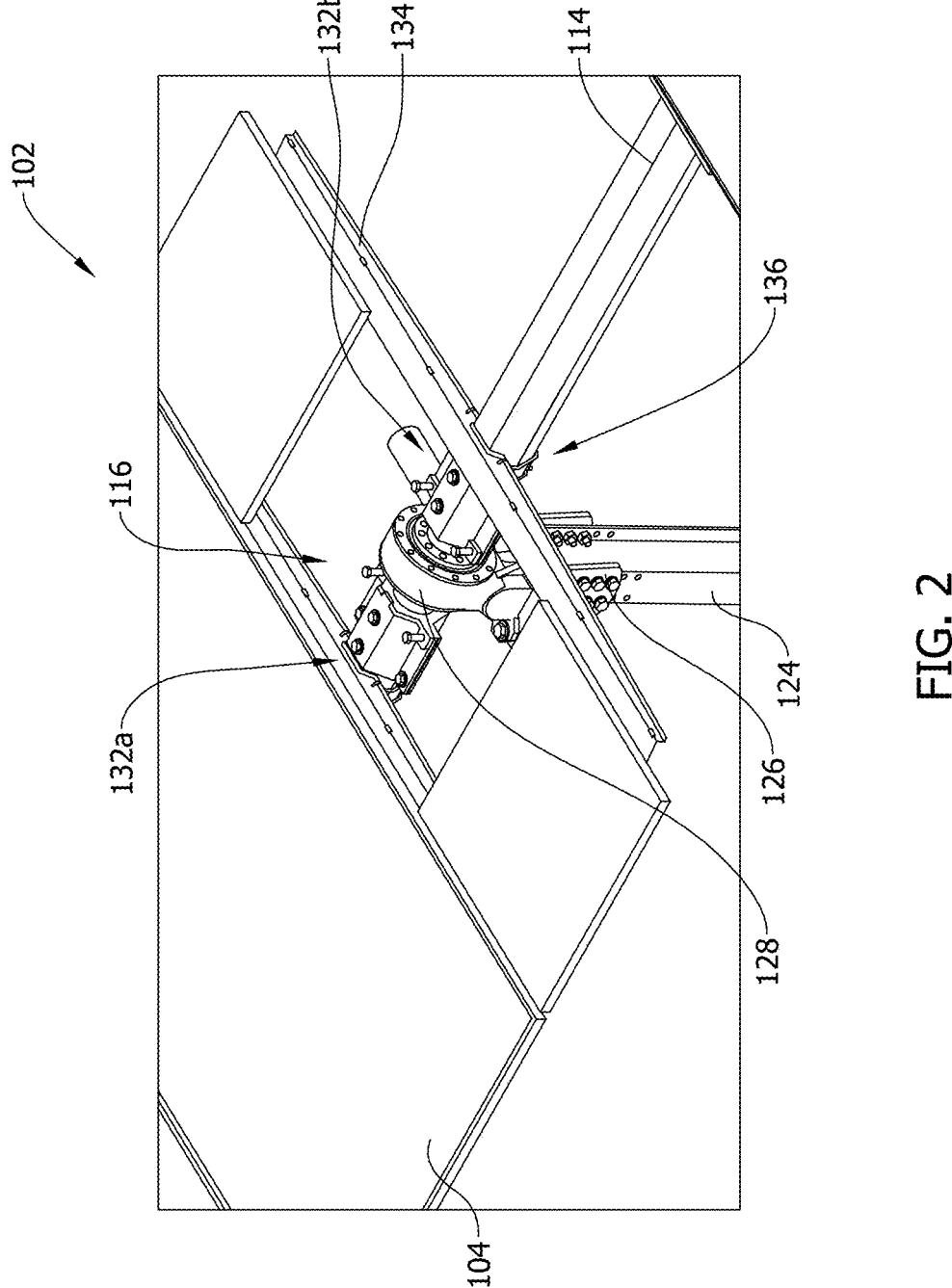
FIG. 2 is an enlarged perspective view of a portion of the solar array row of FIG. 1A, showing a drive, a torque tube, and rails.

FIG. 2 shows an enlarged view of a portion of the solar row 102 shown in FIG. 1A, with a solar panel assembly 104 removed to show the torque tube 114 of the solar array row 102. The drive 116 is connected to the central post 124 by a drive bracket 126. The drive 116 includes a drive housing 128 that is mounted to the drive bracket 126, and the drive bracket 126 is mounted to the central post 124. The drive 116 further includes at least one slewing ring or drive plate 130 (shown in FIG. 3) positioned partially within the drive housing 128 and being rotatable relative to the drive housing 128. The drive 116 shown in FIG. 2 is a slew drive, though in other embodiments the solar row 102 may include another suitable drive 116 that enables the solar array row 102 to function as described.

Figure 3:
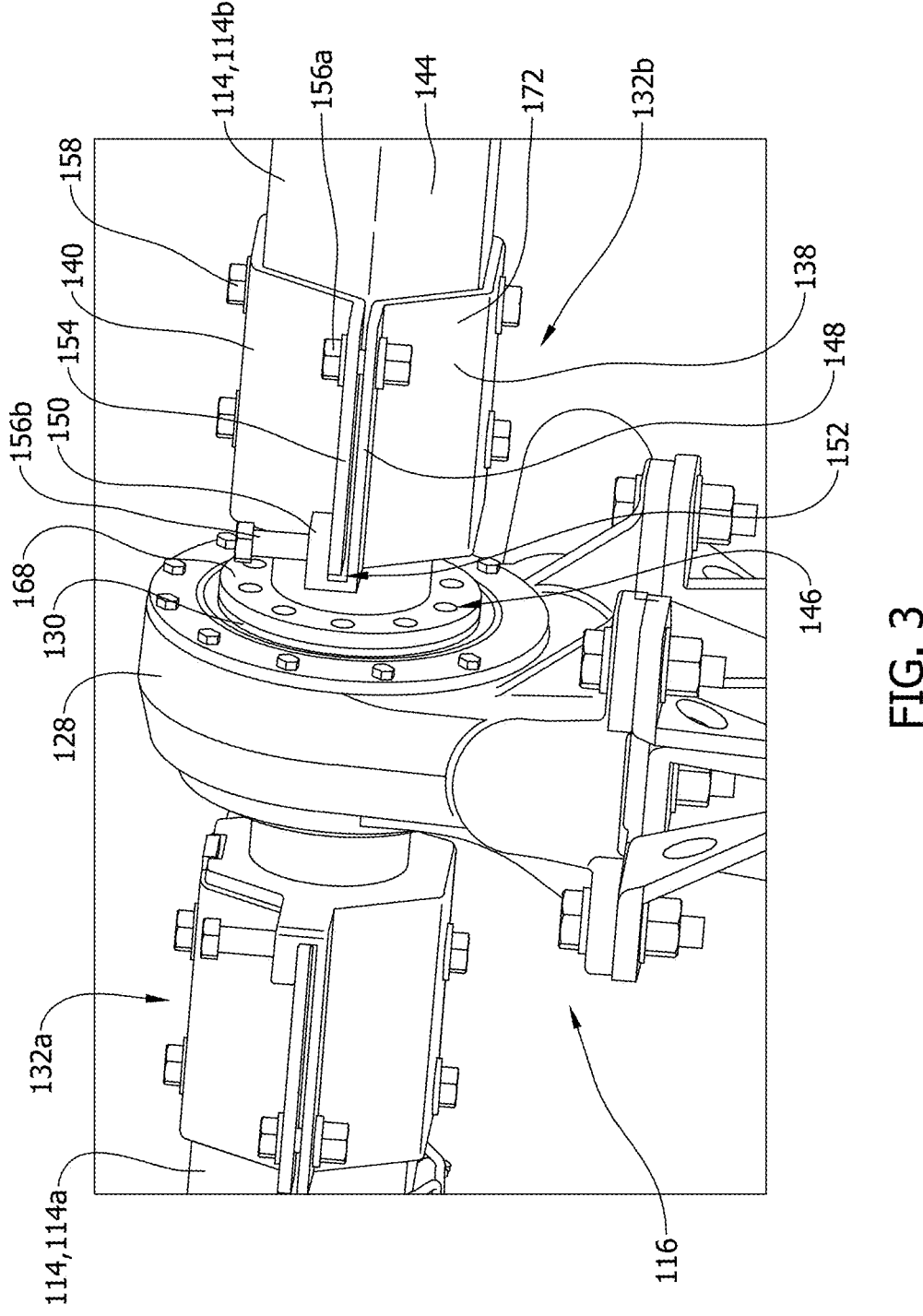
FIG. 3 is an enlarged perspective view of the drive and torque tube shown in FIG. 2.

Referring to FIG. 3, the torque tube 114 includes a pair of torque tube sections 114a, 114b that are connected to opposed sides of the drive 116 by a corresponding pair of saddle assemblies 132a, 132b. The torque tube sections 114a, 114b are rotatable with the drive 116 to rotate the panel assemblies 104 around the longitudinal axis L₁ (shown in FIG. 1A) during tracking. As shown in FIG. 3, a first torque tube section 114a of the first section 118 of the row 102 extends from the drive 116 and to the left of the page and supports panel assemblies 104 in the second section 120 of the row 102 (shown in FIG. 1A). The solar array row 102 further includes a second torque tube 114b section, that is substantially the same as the first torque tube 114a section and extends longitudinally from an opposed side of the drive 116 (i.e., to the right of the page in FIG. 3). The torque tube sections 114a, 114b have a hexagonal profile, though in other embodiments the torque tube sections 114a, 114b may have any suitable shape (e.g., circular, square, etc.). Each of the torque tube sections 114a, 114b includes a plurality of tubes that are connected longitudinally by torque tube brackets 115 (shown in FIG. 7).

Referring back to FIG. 2, the solar array row 102 further includes a plurality of rails 134 (two shown in FIG. 2). The rails 134 are each connected to the torque tubes 114 by rail connectors 136. The rails 134 and rail connectors 136 are collectively referred to herein as a "rail assembly". The rail connectors 136 extend around the torque tube 114 to secure the rails 134 in position on the torque tube 114. The panel assemblies 104 connect to the rails 134, which support the panel assemblies 104 on the torque tubes 114. The rails 134 extend transversely outwards from the torque tube 114 and are longitudinally spaced on the torque tube 114 to fit a panel assembly 104 between adjacent rails 134. Each panel assembly 104 sits on two adjacent rails 134 and each rail 134 supports two adjacent panel assemblies 104. In a suitable method, when actuated, the drive 116 rotates the slewing ring or "drive plate" (shown in FIG. 3) relative to the drive housing 128, thereby rotating the saddle assemblies 132a, 132b, torque tube 114, rails 134, and panel assemblies 104, about the longitudinal axis L₁ (shown in FIG. 1A) of the row 102. The drive 116 engages each of the torque tube sections 114a, 114b in substantially the same manner.

Figure 4:
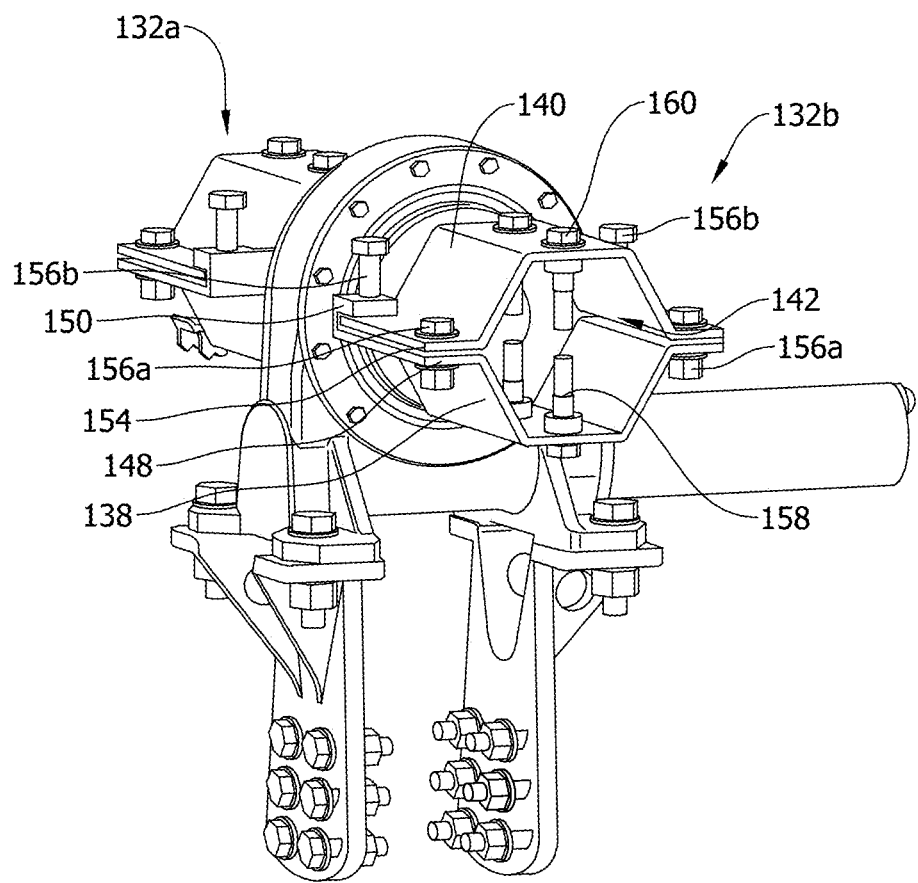
FIG. 4 is a perspective view of the drive of FIG. 3.

FIG. 3 shows a perspective view of the drive 116, torque tube 114, and saddle assemblies 132a, 132b shown in FIG. 2. FIG. 4 is a perspective view of the drive 116 and saddle assemblies 132a, 132b shown in FIG. 3, with the torque tube 114 removed.

As shown in FIG. 3, the saddle assemblies 132a, 132b are each of a two-piece construction and each is substantially the same. The saddle assemblies 132a, 132b each include a saddle body 138 and a clamp shell 140 that is removably clamped to the saddle body 138 for clamping the torque tube 114 therein. The clamp shell 140 and saddle body 138 collectively define a hexagonal opening 142 (shown in FIG. 4) that is shaped and sized in correspondence with the hexagonal profile of the torque tube 114. The torque tube 114 is received within the hexagonal opening 142, with the clamp shell 140 and saddle body 138 contacting an exterior surface 144 of the torque tube 114.

The saddle body 138 defines a plurality of slew apertures 146, which receive fasteners (not shown) therein to connect the saddle body 132 to the drive plate 130 of the drive 116. The saddle body 138 includes a saddle flange 148 and a ledge 150 on each of the opposed sides of the saddle body 138 (one side shown in FIG. 3). The ledge 150 and saddle flange 148 define a slot 152 therein which receives a clamp flange 154 of the clamp shell 140.

Referring to FIG. 4, the saddle assemblies 132a, 132b further includes a plurality of saddle fasteners 156a, 156b and tube fasteners 158. The tube fasteners 158 extend through the clamp shell 140 and/or the saddle body 138 and into the torque tube 114 (shown in FIG. 3). The tube fasteners 158 extend through the clamp shell 140 and saddle body 138 inward into the hexagonal opening 142 for securing the torque tube 114 within the saddle assemblies 132a, 132b. As shown in FIG. 4, four tube fasteners 158 are included, with two tube fasteners 158 being included on opposed sides of the saddle assembly 132b (i.e., two extending through the clamp shell 140 and two extending through the saddle body 138). In the embodiment of FIG. 4, the tube fasteners 158 are expansion bolts that may be tightened from bolt ends 160 exterior of the saddle assembly 132b to secure the torque tube 114 within the saddle assembly 132b.

The saddle fasteners 156a, 156b connect and clamp the clamp shell 140 to the saddle body 138. A first pair of saddle fasteners 156a each extend through an aperture 162 (shown in FIG. 6) defined in the saddle flange 148 and a corresponding aperture (not shown) defined in the clamp flange 154 of the clamp shell 140. A second pair of saddle fasteners 156b extend through an aperture 161 (shown in FIG. 6) defined in the ledge 150 of the saddle body 138 and a corresponding aperture defined in the clamp flange 154 of the clamp shell 140. In the example of FIG. 4 the second pair of saddle fasteners 156b extend to a position adjacent the saddle flange 148 and do not extend through the saddle flange 148. In other embodiments, the second pair of saddle fasteners 156b extend further and through the saddle flange 148.

Figure 5:
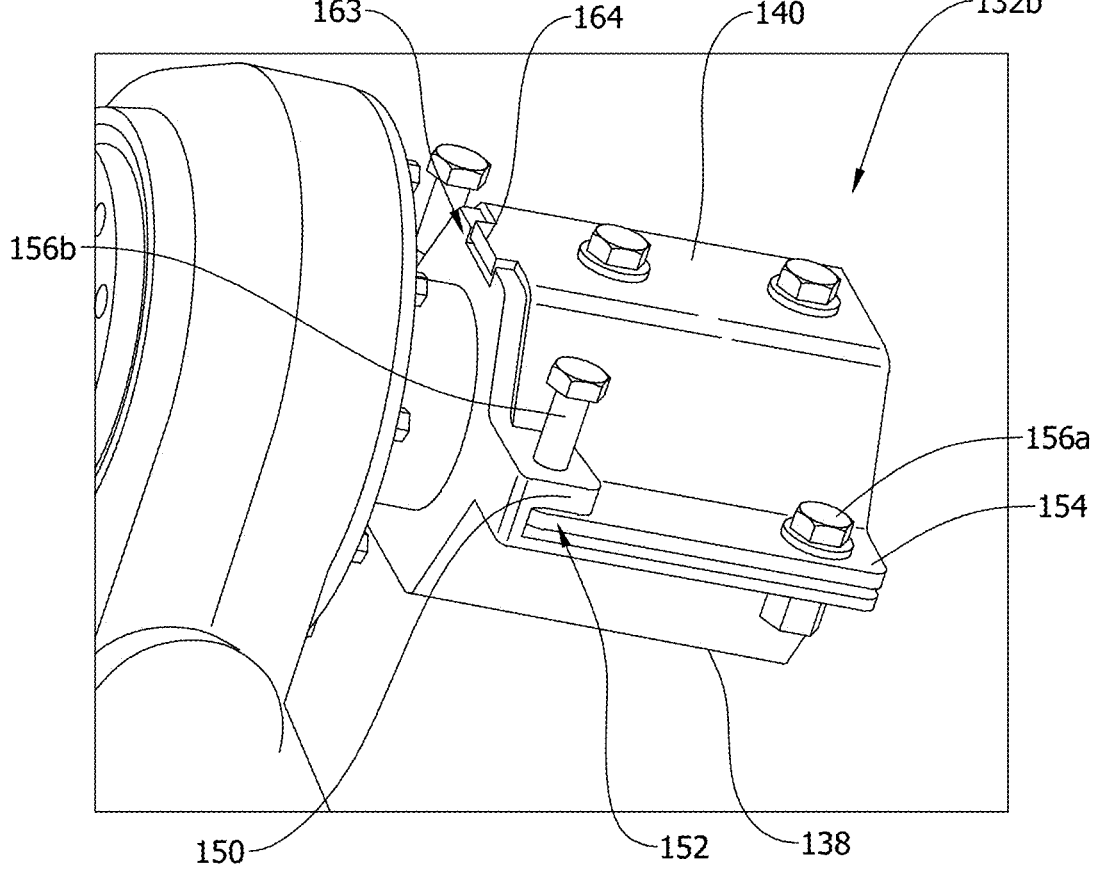
FIG. 5 is a perspective view of a portion of the drive of FIG. 3.

Referring to FIG. 5, the saddle body 138 defines a notch 163 that receives a projection 164 of the clamp shell 140 therein. Additionally, the clamp shell 140, and specifically the clamp flange 154, is positioned within slots 152 of the saddle body 138. Engagement between the projection 164 and the saddle body 138 at the notch 163, as well as between the clamp shell 140 and the ledges 150 facilitates a single piece rigidity for the two-piece saddle assembly 132b. For example, the engagement between the saddle body 138 and clamp shell 140 translates torsional forces between the saddle body 138 and the clamp shell 140 to limit deformation or displacement of the clamp shell 140 relative to the saddle body 138 during use.

Figure 6:
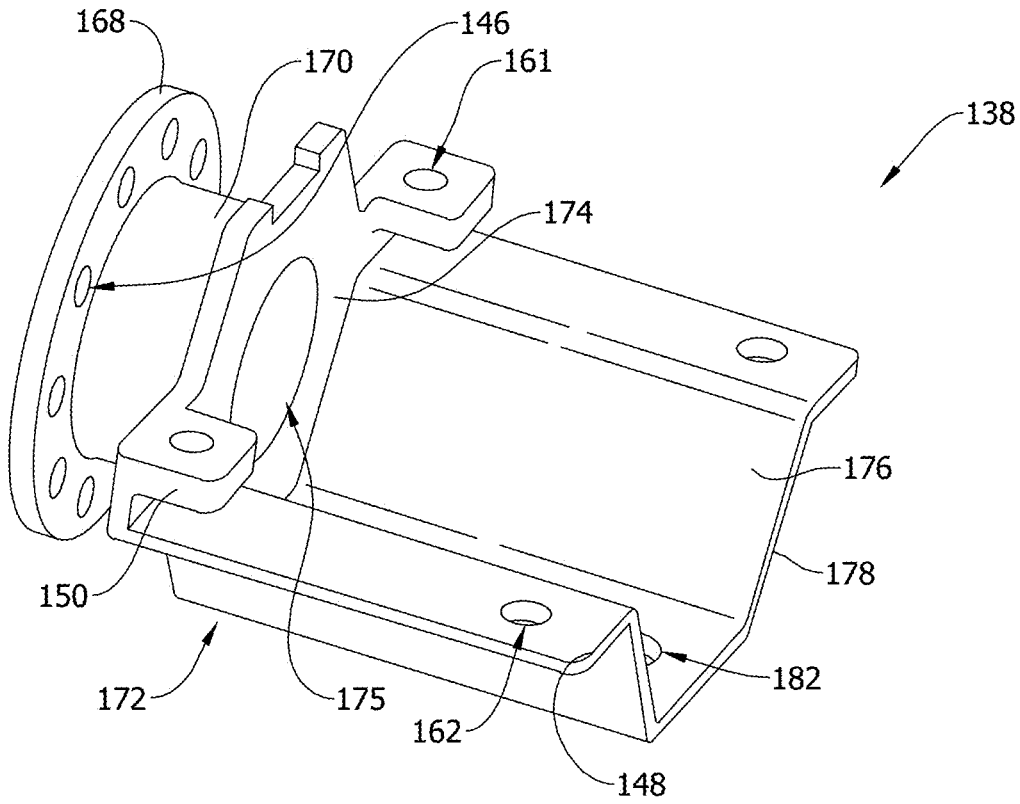
FIG. 6 is a perspective view of a portion of a saddle assembly of the drive of FIG. 3.

FIG. 6 is a perspective view of the saddle body 138. As shown in FIG. 6, the saddle body 138 includes a base plate 168, a neck 170 extending from the base plate 168, and a platform 172 extending from the neck 170. The base plate 168 is circular and defines the slew apertures 146 for connecting the saddle body 138 to the drive 116 (shown in FIG. 3). The neck 170 extends longitudinally from the base plate 168 (when the base plate 168 is connected to the drive 116) to an end wall 174 of the platform 172. As shown in FIG. 6, the neck 170 is hollow and the end wall 174 defines an opening 175 extending into the hollow neck 170. In other embodiments, the neck 170 may not be hollow.

The platform 172 includes the end wall 174, the ledges 150, the saddle flanges 148, inner surfaces 176 and opposed outer surfaces 178. The inner surfaces 176 are shaped complementary to the exterior surface 144 of the torque tube 114 and, in the embodiment of FIG. 6, is in the shape of a half hexagon. The saddle flanges 148 each extend outward from the inner surface 176 and define the apertures 162 which receive the first saddle fasteners 156a (shown in FIG. 3), therein. The ledge 150 defines the apertures 161, with each ledge 150 receiving one of the second saddle fasteners 156b (shown in FIG. 3) therethrough. When assembled, the second saddle fasteners 156b extend through the ledge 150 through the respective apertures 162 and into corresponding threaded apertures (not shown) defined in the clamp shell 140 (shown in FIG. 5). Threads (not shown) on the second saddle fasteners 156b engage the corresponding threaded apertures on the clamp shell. The platform 172 further defines tube apertures 182 that extend through the platform 172 for receiving the tube fasteners 158 (shown in FIG. 3), therethrough.

Referring back to FIG. 3, in one method to connect the torque tubes 114 to the drive 116, the saddle assembly 132b is coupled to the drive plate 130 by installing fasteners through the slew apertures 146 on the base plate 168 of the saddle body 138. The torque tube 114 is seated on the platform 172 of the saddle body 138 and the tube fasteners 158 are installed and secured. The clamp shell 140 is then installed on the saddle body 138 and secured using the saddle fasteners 156a, 156b.

Figure 7:
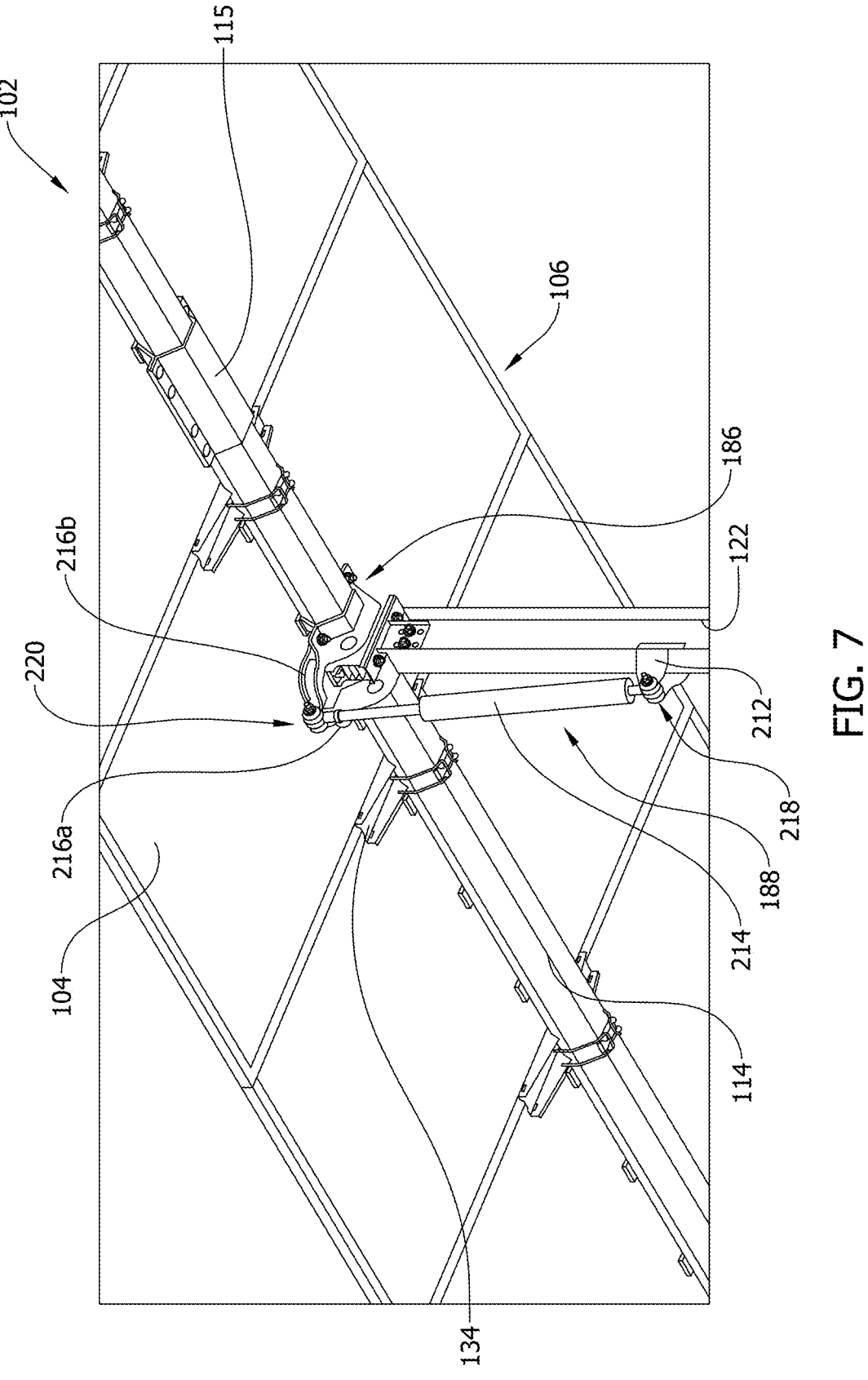
FIG. 7 is a bottom perspective view of a portion of a back side of the solar array row of FIG. 1A, showing a torque tube, a bushing assembly, a damper assembly, rails, and solar panel assemblies.

FIG. 7 is a perspective view of a portion of the back side 106 of the solar panel row 102, showing a bushing assembly 186 and a damper assembly 188 mounted on a post 122 of the solar array row 102. The solar array row 102 includes a plurality of bushing assemblies 186 and damper assemblies 188 that connect to the torque tube 114 and which are included on each of the posts 122 of the solar array row 102. In other embodiments, some of the posts 122 do not include a damper assembly 188 mounted thereon. As shown in FIG. 7, a plurality of rails 134 are also mounted on the torque tube 114 and are each connected to two adjacent panels 104. The rails 134 are each secured to the torque tube 114 by a corresponding rail connector 136.

The damper assembly 188 includes a post bracket 212, a damper 214, and a pair of damper brackets 216a, 216b. The damper 214 extends between a first end 218 that is pivotably connected to the post bracket 212 and a second end 220 that is pivotably connected to the damper brackets 216a, 216b. In FIG. 7, the damper 214 is a hydraulic damper though other suitable dampers may be used.

Figure 8:
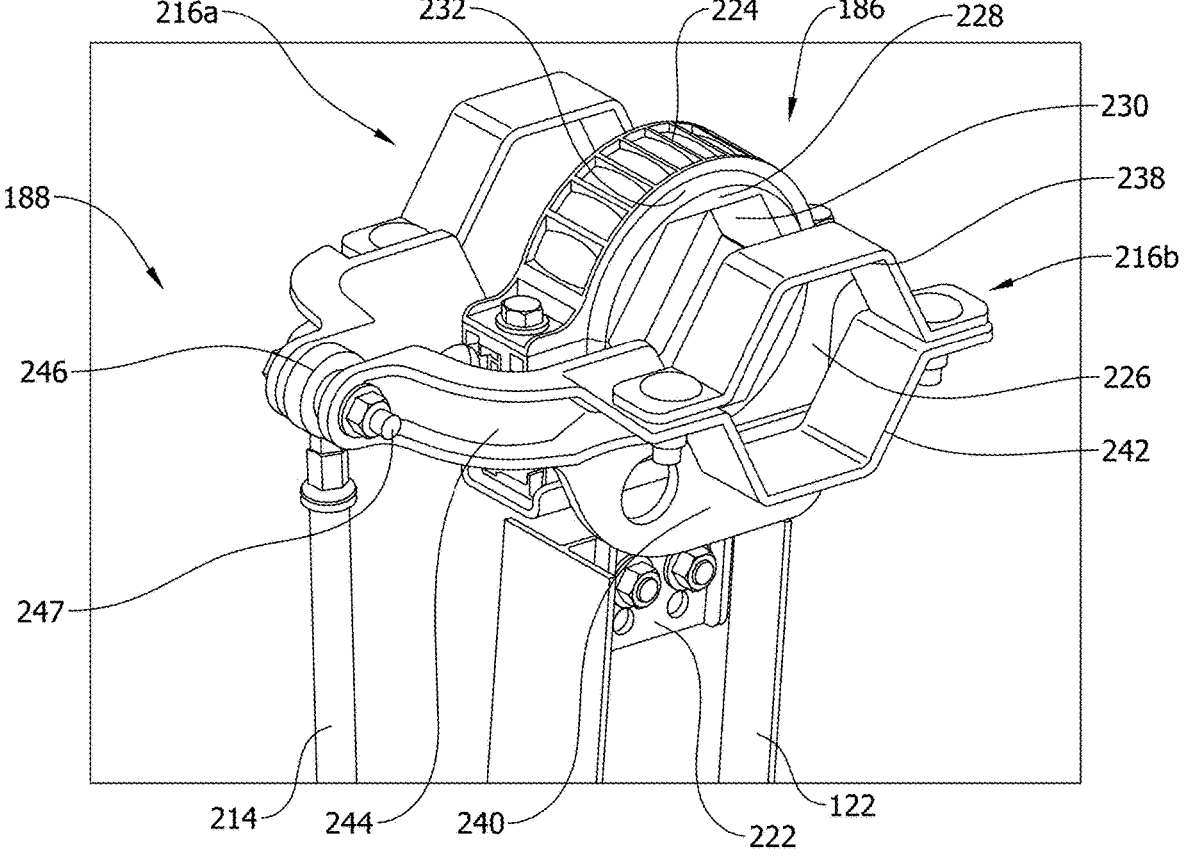
FIG. 8 is a perspective view of the damper assembly, bushing assembly, and post of FIG. 7.

FIG. 8 shows a portion of the damper assembly 188, the bushing assembly 186, and the post 122, shown in FIG. 7. The bushing assembly 186 includes a bushing bracket 222 mounted on the post 122, a first block 224, a second block 226 attached to the bushing bracket 222 and the first block 224, and a bushing 228 positioned between the first block 224 and the second block 226. The bushing 228 includes an interior surface 230 that contacts the torque tube 114 (shown in FIG. 7) and an outer surface 232 that contacts an interior surface 234 (shown in FIG. 10) of the first and second blocks 224, 226.

In the embodiment of FIG. 8, the bushing 228 is made of a first lightweight material and the blocks 224, 226 are each made of a second heavier weight material. Specifically, the blocks 224, 226 are each made of steel and the bushing 228 is made of aluminum. The bushing 228 of FIG. 8 is two-piece bushing, though in other embodiments the bushing 228 may be formed as a single piece.

The damper assembly 188 includes first and second damper brackets 216a, 216b which attach to the torque tube 114 (shown in FIG. 7) on opposed sides of the bushing assembly 186. The first and second damper brackets 216a, 216b are substantially the same, except for being mirrored about the bushing assembly 186. The brackets 216a, 216b each include a clamp section 238 and a bracket base 240. The clamp section 238 attaches to the bracket base 240 to define a torque tube opening therebetween that is sized and shape to receive the torque tube 114 therein. Specifically, the bracket base 240 includes a tube section 242 that contacts the torque tube 114 to support the damper bracket 216a on the torque tube 114. The clamp and tube section 238, 242 collectively extend around the torque tube 114 in face-to-face contact with each of the sides of the torque tube 114.

The damper brackets 216a, 216b further each include a pair of curved prongs 244 that curve inward from the tube section 242 towards alignment with the bushing assembly 186. The curved prongs 244 extend to distal ends of the bracket 216b that receive a second end 246 of the damper 214 therein. Specifically, a pin 247 extends through each of the damper brackets 216a, 216b and the second end 246 of the damper 214 to pivotably connect the damper 214 to the damper brackets 216a, 216b. In the example embodiment the curved prong 244 and tube section 242 are formed as a single-piece construction. In other embodiments, the tube section, 242, the curved prong 244, and any other portion of the damper brackets 216a, 216b may be formed as one or more weldments.

Figure 9:
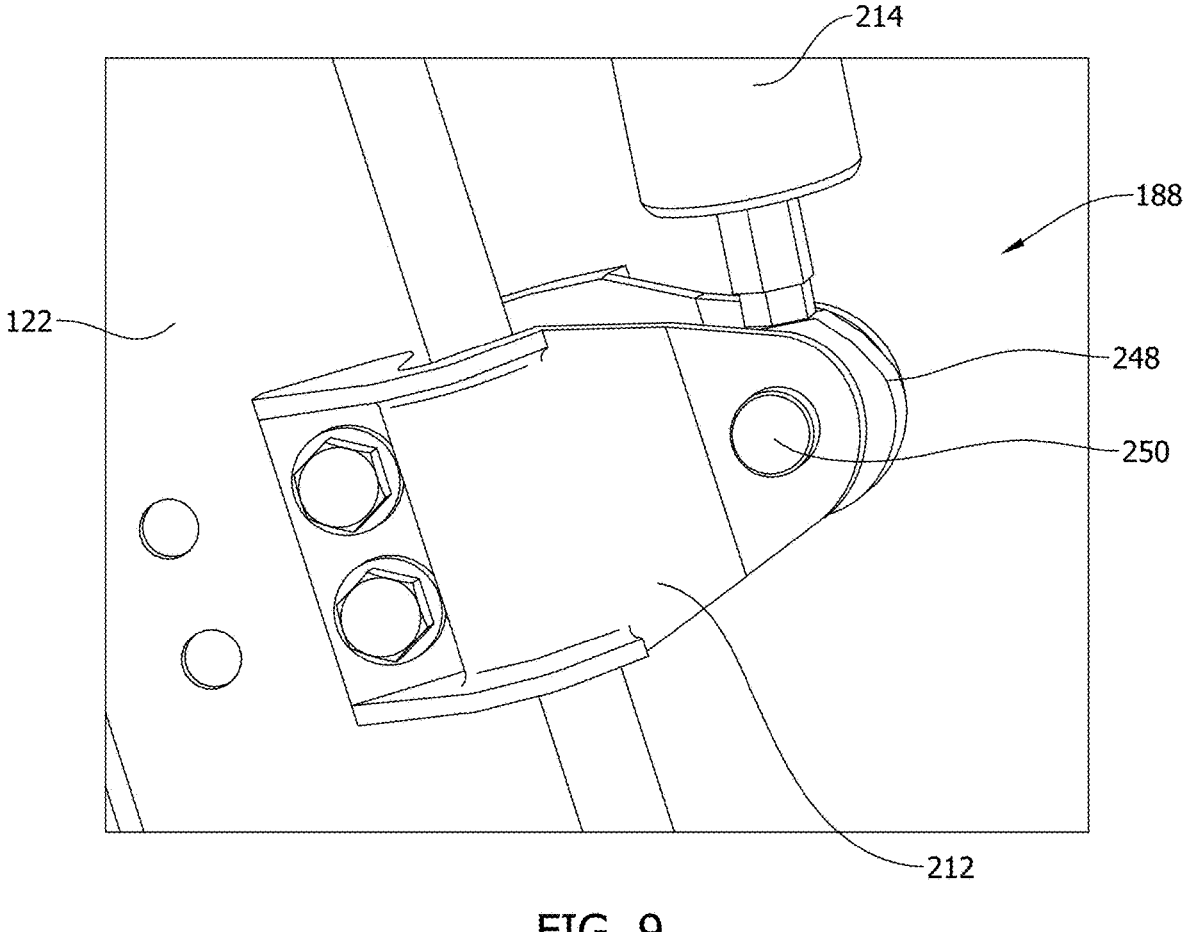
FIG. 9 is a perspective view of a portion of the damper assembly of FIG. 7, showing a portion of the damper and a post bracket on a post.

FIG. 9 shows a portion of the damper assembly 188 of FIG. 8 mounted on the post 122. The damper assembly 188 includes a post bracket 212 attached to the post 122 which receives a pin 250 therethrough. The pin 250 extends through a first end 248 of the damper 214 to pivotably connect the damper 214 to the post 122.

Figure 10:
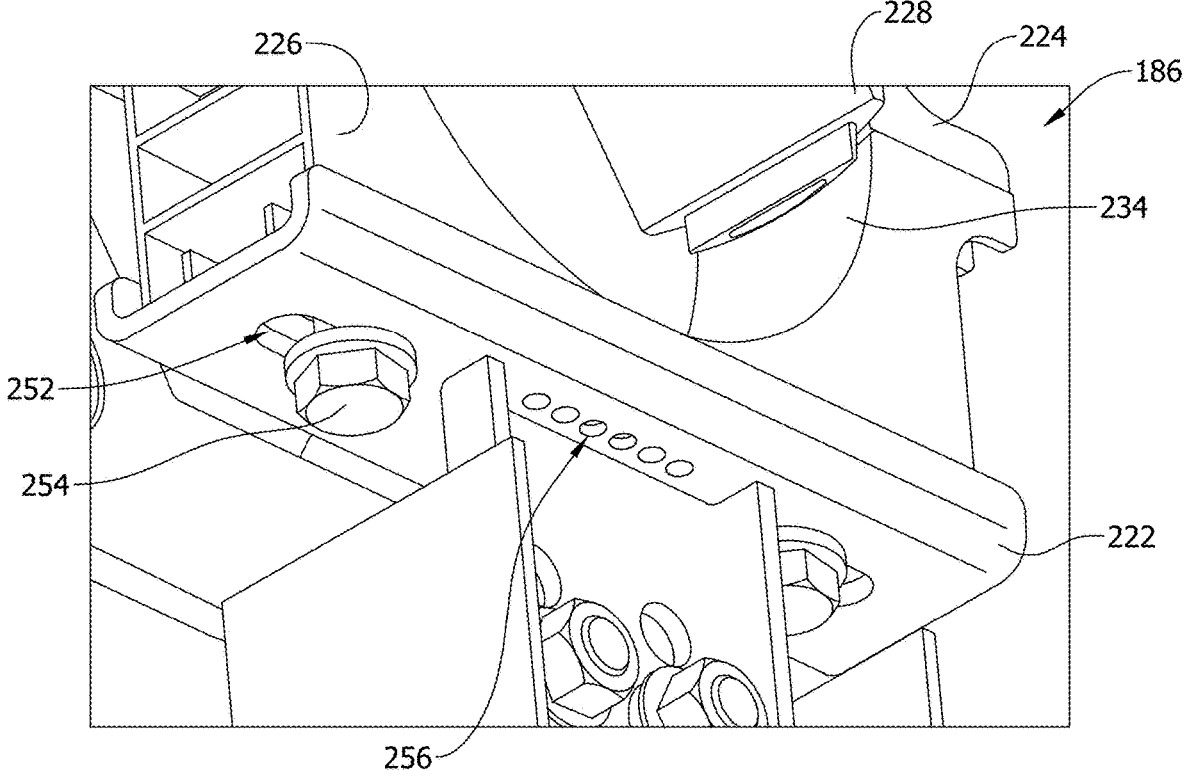
FIG. 10 is a perspective view of a portion of the bushing assembly of FIG. 7, showing a portion of the bushing removed.
Figure 11:
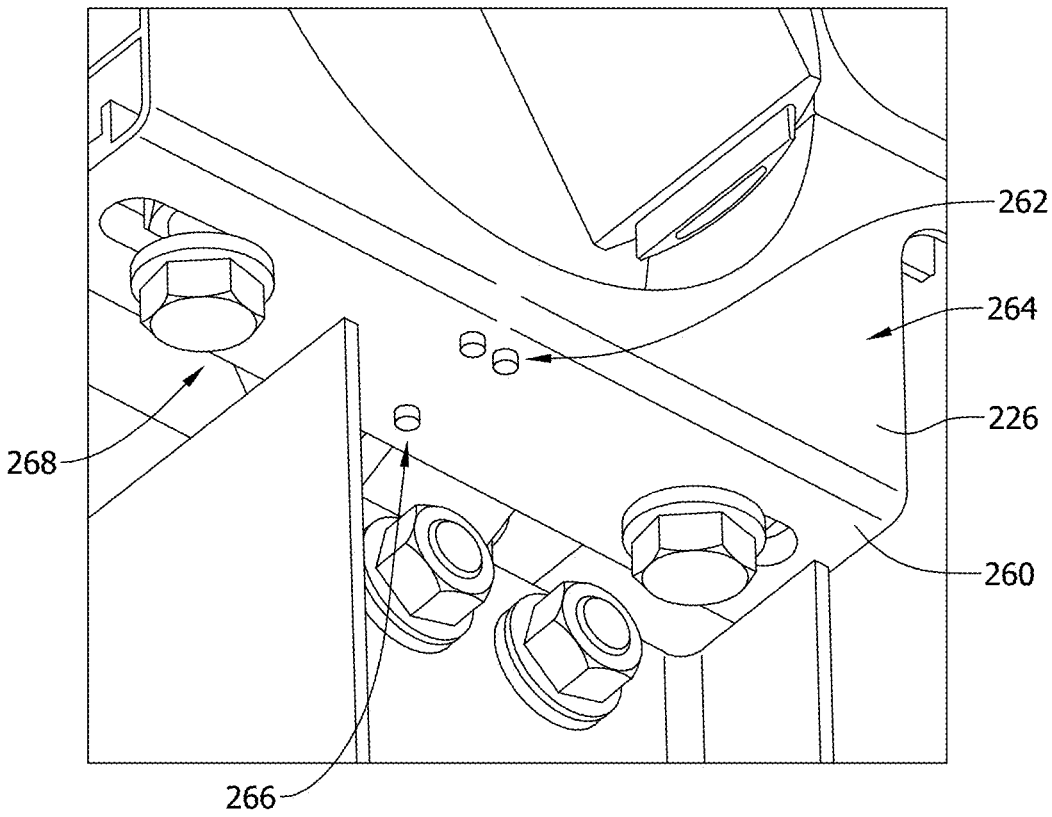
FIG. 11 is a perspective view of the portion of the bushing assembly of FIG. 10, showing a bushing bracket removed.

FIG. 10 shows a portion of the bushing assembly 186 of FIG. 8, with a portion of the bushing 228 removed. FIG. 11 shows the portion of the bushing assembly 186 shown in FIG. 8, with the bushing bracket 222 removed.

Referring to FIG. 10, the bushing bracket 222 includes a pair of transverse slots 252 that extend through the bushing bracket 222. Fasteners (bolts in FIG. 10) 254 extend through the slots 252 and into the second block 226 to secure the second block 226 on the bushing bracket 222. The slots 252 each have a transverse width that is greater than a width of the fasteners 254 to allow for transverse adjustment (i.e., perpendicular to the longitudinal axis L₁ of FIG. 1) of the blocks 224, 226 on the bushing bracket 222. The bushing bracket 222 further defines alignment apertures 256 extending through the second blocks 226 that are each positioned in transverse spacing from one another.

Referring to FIG. 11, the second block 226 includes alignment projections 258 that project downward from a lower surface 260 of the second block 226. The alignment projections 262, 266 include a set of two first alignment projections 262 proximate a first side 264 of the second block 226 and a single second alignment projection 266 positioned proximate an opposed second side 268 of the second block 226. The alignment projections 262, 266 are shaped and sized in correspondence with the alignment apertures 256 on the bushing bracket 222 (shown in FIG. 10) for insertion into the alignment apertures 256. Specifically, the alignment projections 262, 266 have a cylindrical shape, though other suitable shapes may be used. The alignment projections 262, 266 and apertures 256 allow for guided transverse adjustment of a position of the bushing blocks 224, 226 on the bushing bracket 222 during installation.

Figure 12:
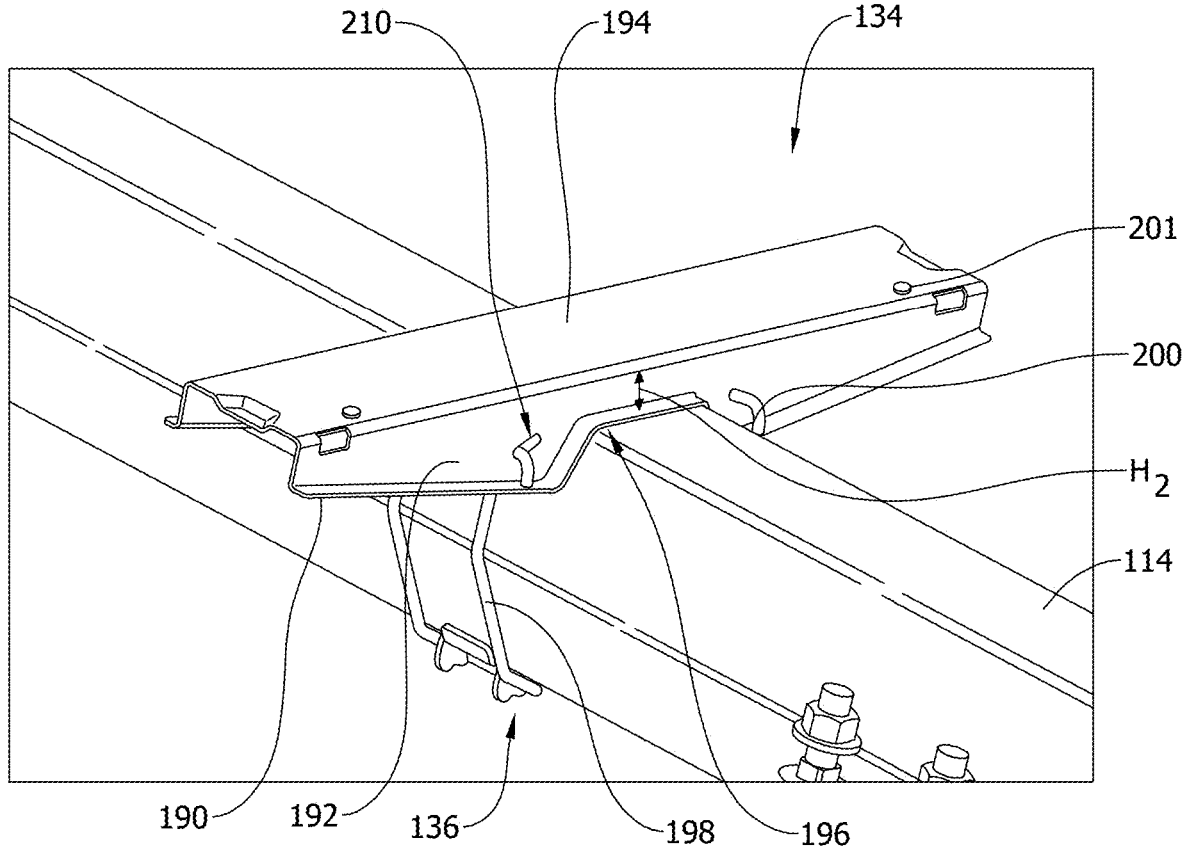
FIG. 12 is a perspective view of one of the rails on the torque tube of FIG. 7.

FIG. 12 is a perspective view of the torque tube 114 and rail 134 shown in FIG. 7. The rail 134 extends transversely outward of the torque tube 114 and extends longitudinally between a pair of opposed side flanges 190. The rail 134 further includes sidewalls 192 extending from the flanges 190 to a mounting wall 194. The mounting wall 194 supports the panel assemblies 104 (shown in FIG. 7) thereon. The solar array row 102 further includes a plurality of panel connectors, such as cinch clips 605 (shown in FIG. 18), which secure the panel assemblies 104 on the rail 134.

The sidewalls 192 and side flanges 190 of the rail 134 define a rail notch 196, which is shaped in correspondence with the torque tube 114. Specifically, the flanges 190 contact three surfaces of the hexagonal torque tube 114, which limits transverse sliding of the rail 134 on the torque tube 114. The rail connector 136 includes a pair of clips 198, 200, which are connected to the rail 134 on opposed sides of the torque tube 114 and which extend through slots 210 defined in the sidewalls 192. The rail 134 further includes a plurality of index projections 201, which protrude above the mounting wall 194 for guiding assembly of the panels 104 on the rail 134, as described in greater detail with respect to the embodiment of FIGS. 10 and 11 below.

Figure 13:
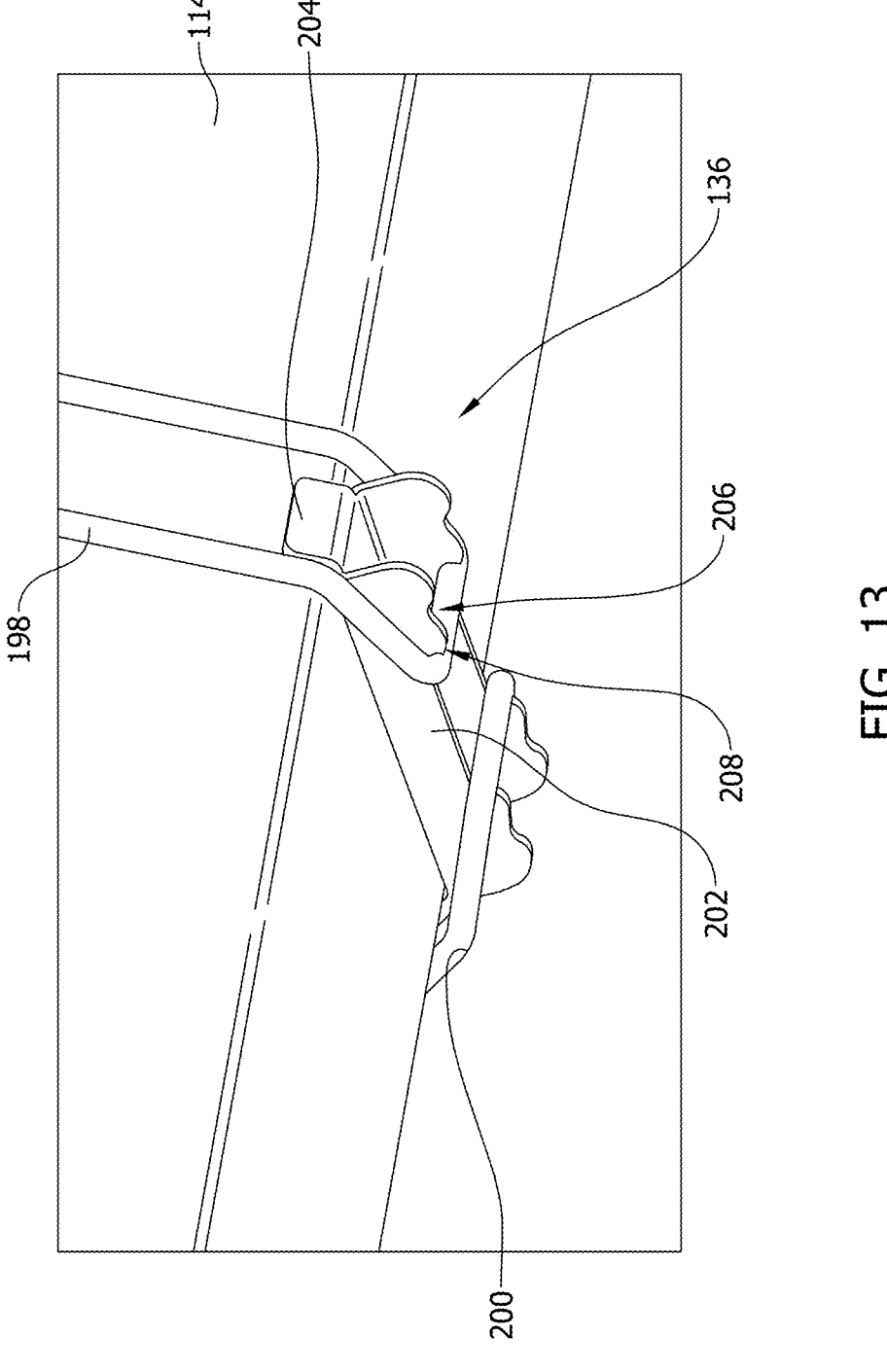
FIG. 13 is a perspective view of a portion of a rail connector for connecting the rail on the torques tube of FIG. 7.

FIG. 13 shows a perspective view of a portion of the rail connector 136 and torque tube 114, shown in FIG. 12. The clips 198, 200 of the rail connector 136 include a first clip 198 and a second clip 200. The rail connector 136 further includes a lock bracket 202 which is in contact with the torque tube 114 and which is held on the torque tube 114 by tension exerted on the lock bracket 202 by the first and second clips 198, 200. The lock bracket 202 includes a pair of wings 204 (one shown in FIG. 13), that flare out to distal ends of the lock bracket 202 and contact opposed side surfaces of the torque tube 114. The lock bracket 202 defines a pair of installation notches 206 and lock notches 208.

During assembly, with the rail 134 seated on the torque tube 114 as shown in FIG. 12, the lock bracket 202 is inserted between the two clips 198, 200 and one of the clips 198, 200 is positioned within a lock notch 208. The other of the two clips 198, 200 is then moves to the installation notch 206 and tooling is used to overcome natural tension of the other clip 198, 200 and position it within the other lock notch 208. With each of the clips 198, 200 in the lock notches 208, the clips 198, 200 apply tension on the lock bracket 202 to secure the lock bracket 202 and the rail 134 (shown in FIG. 12) in position on the torque tube 114. The rail connector 136 thereby facilitates securing the rail 134 on the torque tube 114 without the use of threaded fasteners (e.g., nuts, bolts, screws, etc.). In other words, no threaded fasteners are used to secure the rail 134 on the torque tube 114 and the rail 134 is instead held in position by a clamping force applied on the torque tube 114 by the rail 134 and the lock bracket 202 due to the tension in the clips 198, 200.

Figure 14:
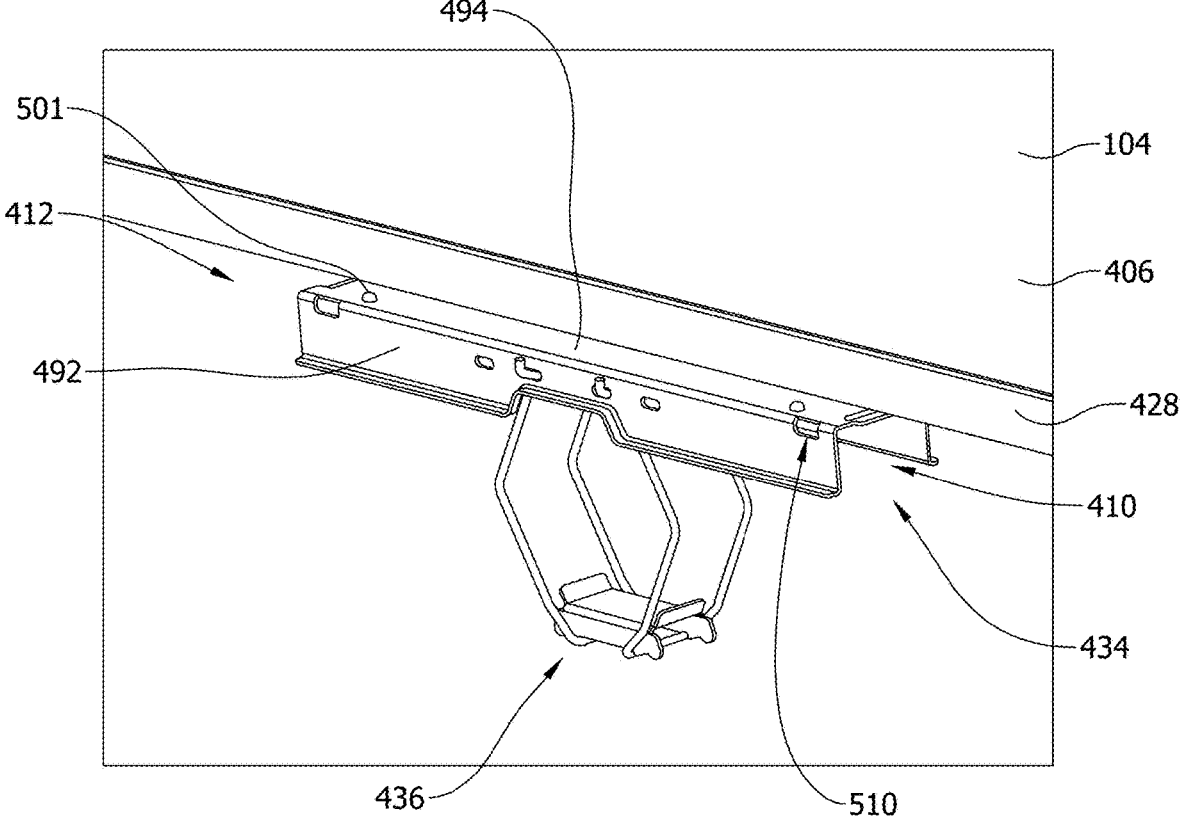
FIG. 14 is a perspective view of an alternative rail with a solar panel assembly of the solar array row of FIG. 1A.
Figure 15:
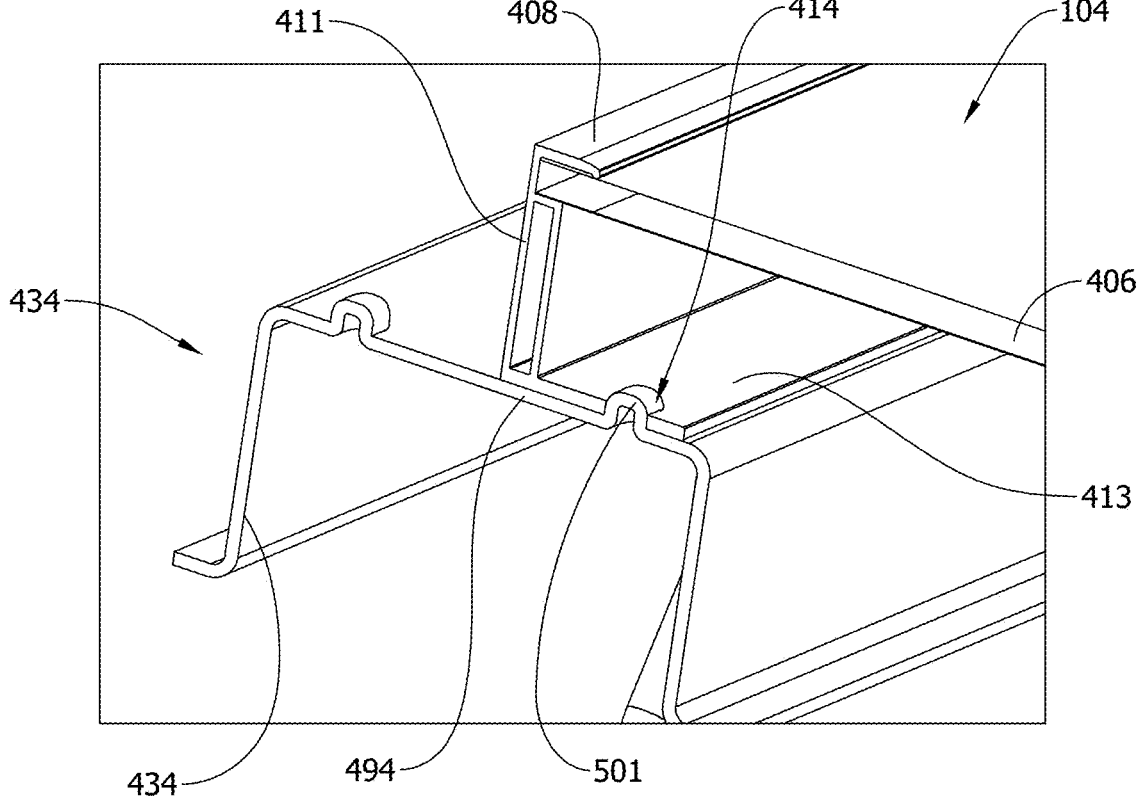
FIG. 15 is an enlarged cross section view of a portion of the rail and panel assembly shown in FIG. 14.

FIG. 14 shows an alternative rail 434 and rail connector 436 for use with a panel assembly 104 of the solar array row 102 of FIG. 1A. FIG. 15 shows a cross section of the rail 434 and panel assembly 104 shown in FIG. 14.

Referring to FIG. 14, the rail 434 is substantially the same as the rail 134 of FIG. 12, apart from the shape of the sidewalls 492. In particular, the rail 434 includes a plurality of index projections 501 that project above a mounting wall 494 of the rail 434. The index projections 501 and engagement between the rail 434 of FIG. 14 and the panel assembly 104 is substantially the same as the rail 134 of FIG. 12.

Referring to FIG. 15, the panel assembly 104 includes a panel 406 and a frame 408 attached to the panel 406. The panel frame 408 sits on the rail 434 and may be secured by one or more clips, similar to the cinch clips 605 (shown in FIG. 18) that extend through end slots 510 of the rail 434 and engage the frame 408. The rail 434 extends between first and second ends 410, 412 and includes four index projections 501 (two shown in FIG. 10) that are positioned on the mounting wall 494 adjacent the first and second ends 410, 412 and adjacent the sidewalls 492.

Referring to FIG. 15. The panel frame 408 includes a frame sidewall 411 and a lip 413. The lip 413 is seated on the mounting wall 494 of the rail 434 and extends from the frame sidewall 411 to the sidewall 492 of the rail 434. Specifically, the lip 413 is in face-to-face contact with the rail 434. The lip 413 defines a lip aperture 414 that is sized to receive the index projection 501 therein. In the example embodiment, the lip aperture 414 is closed within the lip 413 of the panel frame 408, though in other embodiments, the lip aperture 414 may extend to a distal edge (not shown) of the lip 413. The engagement between the index projection 501 and the lip aperture 414 of the panel 406 facilitates correct positioning of the panel frame 408 on the mounting rail 434. For example, during assembly, an operator may install the panel frame 408 on the mounting rail 434 by aligning the index projections 501 with the corresponding lip apertures 414 to guide placement of the panel assemblies 104 on the rail 434.

FIGS. 16-19 show a portion of the solar tracker system 100 including an alternative rail 634a and rail connectors 636 mounting first and second panel assemblies 104a, 104b to a portion of the torque tube 114. The alternative rails 634 and rail connectors 636 shown in FIGS. 16-25 are substantially similar to the rails 634 and rail connectors 636 shown in FIGS. 12-15, except as otherwise described differently below.

Figure 16:
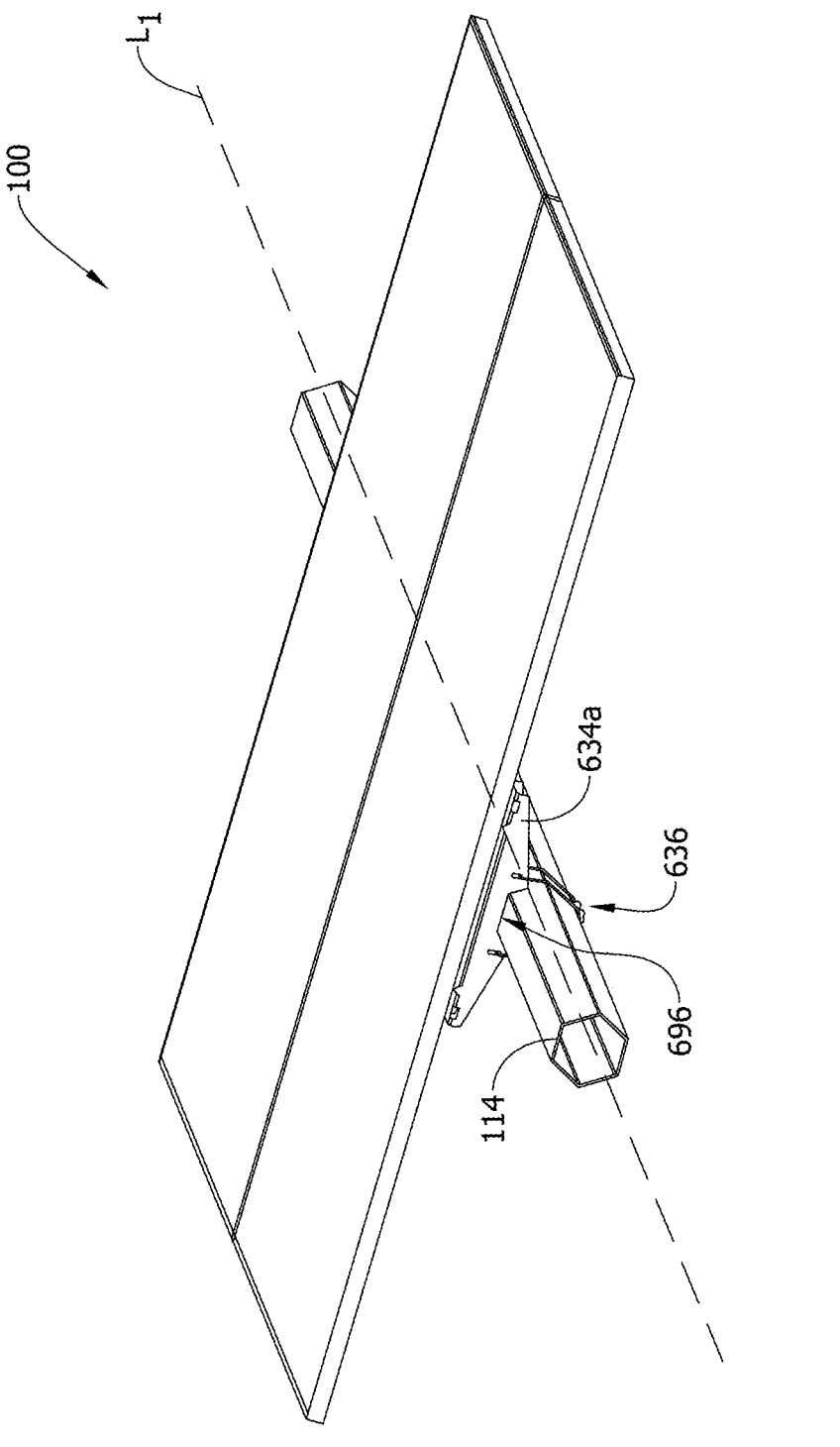
FIG. 16 is a perspective view of a portion of the solar array row shown in FIG. 1, showing an alternative rail and rail connector.

Referring to FIG. 16, the rail 634a defines a rail notch 696, alternatively referred to herein as a "saddle," that receives a portion of the torque tube 114 therein. The rail notch 696 has a cross-sectional profile that is sized and shaped to extend partially around three sides of the torque tube 114 to limit transverse movement of the rail 634. For example, the cross-sectional profile of the rail notch 696 is complementary to the torque tube 114 on three sides. The rail 634 extends transversely outward from the torque tube 114 (i.e., generally perpendicular to the longitudinal axis $L_1$) on opposed sides of the rail notch 696. The rail connector 636 attaches the rail 634 to the torque tube 114 in a substantially similar manner as described with respect to the rail connector 136 shown in FIGS. 12-15. That is, the rail connector 636 is attached to the rail 634 and is clamped around the torque tube 114 to secure the rail 634 in position on the torque tube 114.

Figure 17:
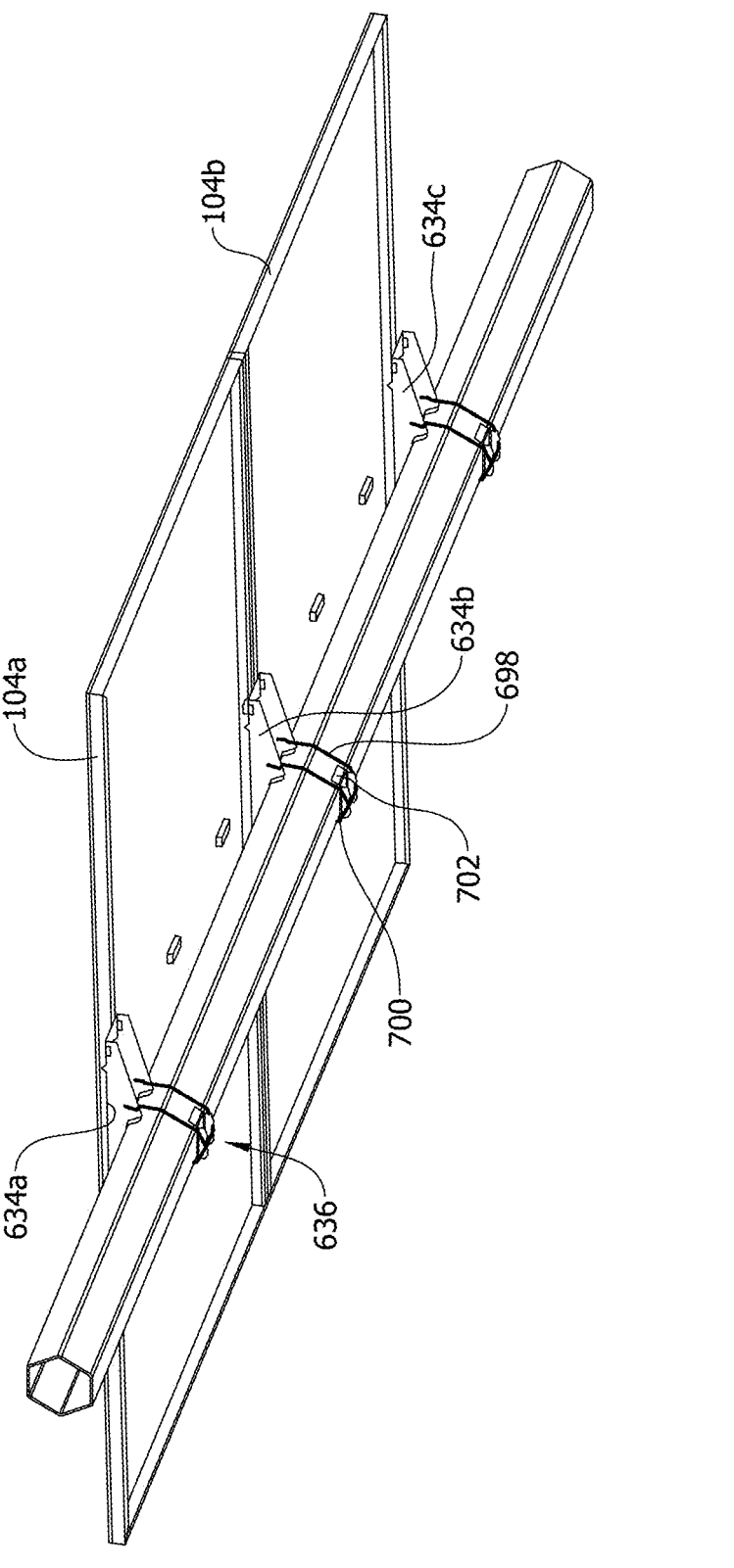
FIG. 17 is another perspective view of the portion of the solar array row shown in FIG. 16.

Referring to FIG. 17, three rails 634a, 634b, 634c are shown supporting the first panel assembly 104a and the second panel assembly 104b. Each of the rails 634a, 634b, 634c, rail connectors 636, and panel assemblies 104a, 104b are substantially identical to one another. Each of the rails 634a, 634b, 634c is configured to support two longitudinally adjacent panel assemblies 104a, 104b thereon and each panel assembly 104a, 104b sits on two different longitudinally adjacent rail connectors 636. For example, as shown in FIG. 17, the first panel assembly 104a is seated on both the first and second rails 634a, 634b and the second panel assembly 104b is seated on both of the second and third rails 634b, 634c. Additional panel assemblies (not shown) may also be seated on the first rail 634a, 634c next to the first panel assembly 104a and second panel assembly 104b, respectively.

Figure 18:
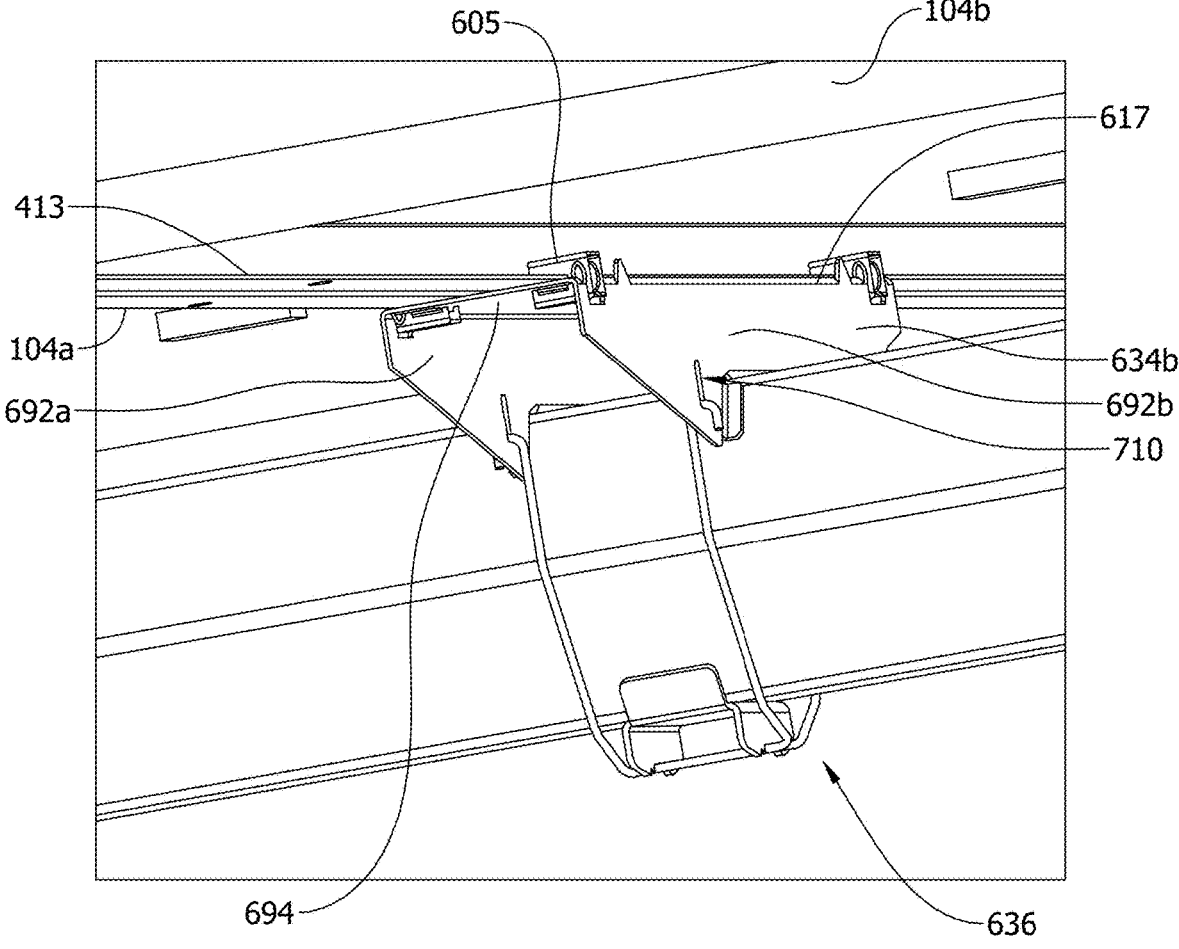
FIG. 18 is an enlarged perspective view of the portion of the solar array row shown in FIG. 16.

Referring to FIG. 18, the second rail 634b mounted to the first and second panel assemblies 104a, 104b is shown. The rail 634b includes a first sidewall 692a, a second sidewall 692b, and a mounting wall 694 extending longitudinally between the first sidewall 692a and the second sidewall 692b. The rail 634b includes curved edges 617 connecting the mounting wall 694 to the first and second sidewalls 692a, 692b. The first and second sidewalls 692a, 692b each define a pair of slots 710 that receive the clips 698, 700 (clips 698, 700 may alternatively referred to herein as "bails") of the rail connectors 636 therein. In contrast with the slots 710 of the rail 134 shown in FIG. 12, which extend obliquely inward on the sidewalls 192, the slots 710 on the rail 634b of FIG. 16 extend generally vertically along the sidewalls 692a, 692b (i.e., perpendicular to the longitudinal axis $L_1$ shown in FIG. 16 and the mounting wall 694). The vertical orientation of the slots 710 reduces shifting movement of the clips 698, 700 as the torque tube 114 is rotated, such as during normal tracking operations.

Figure 25:
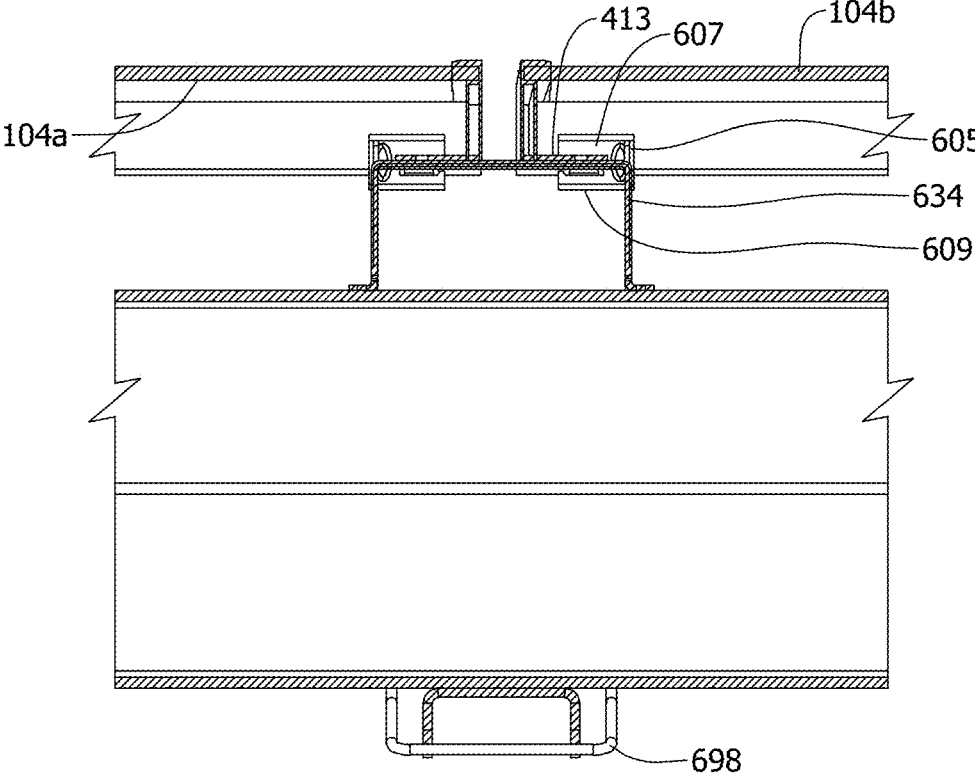
FIG. 25 is a sectional view showing a third step in installing the panel assembly on the rail shown in FIG. 16.

Referring to FIG. 18, a set of panel connectors 605, alternatively referred to herein as "cinch clips," attach the panel assemblies 104a, 104b to the rail 634b. The rail 634b includes clip openings 611 (shown in FIG. 21) sized and shaped to receive a portion of the cinch clips 605. The cinch clips 605 are shaped to grip or hold the lip 413 of the panel assemblies 104a, 104b and the rail 634b within the cinch clips 605. For example, as shown in FIG. 25, the cinch clips 605 include upper and lower jaws 607, 609 to grip the lip 413 and the rail 634b. Referring back to FIG. 18, two cinch clips 605 attach the rail 634b to the second panel assembly 104b. Additionally, two other cinch clips 605 may be included, only one of which is visible in FIG. 18, which attach the first panel assembly 104a to the rail 634b. In other embodiments, any suitable size or number of cinch clips 605 may be used.

Figure 19:
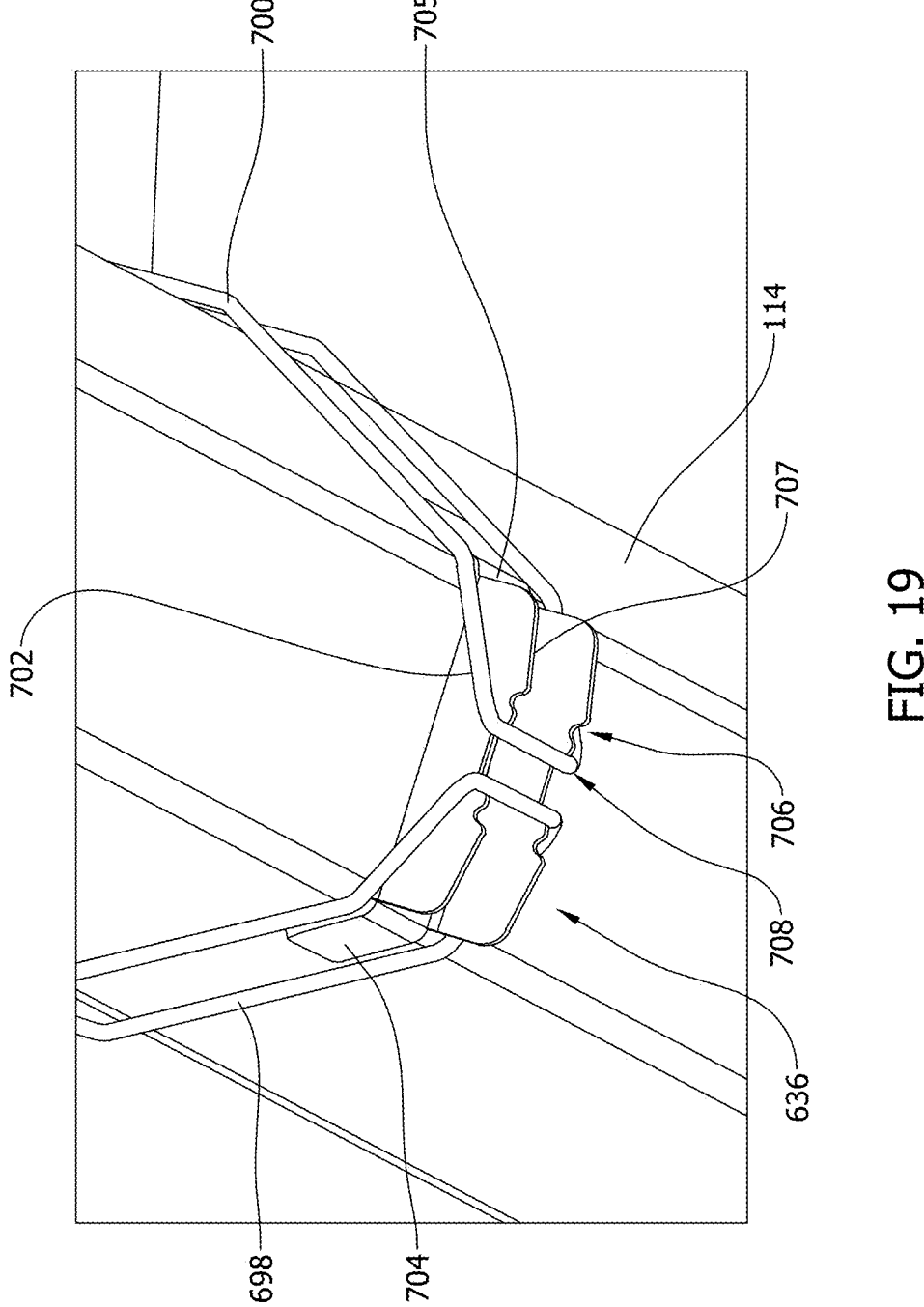
FIG. 19 is another enlarged perspective view of the portion of the solar array row shown in FIG. 16, showing clips and a lock bracket of the rail connector.

FIG. 19 shows a portion of the rail connector 636 connecting the second rail 634b (shown in FIG. 18) to the torque tube 114. Similar to the embodiment of FIG. 13, the rail connector 636 includes first and second clips 698, 700 and a lock bracket 702. The first and second clips 698, 700 each attach to the rails 634 through the vertical slots 710 shown in FIG. 18. The clips 698, 700 are made of a spring steel and may be flexed to tightly secure the rail 634b on the torque tube 114 when attached to the lock bracket 702. For example, during installation, the first clip 698 and second clip 700 may be flexed, without the use of tools (e.g., by hand of an operator), to position the respective clips 698, 700 in each of the installation notches 706. When the clips 698, 700 are in the installation notches 706, the tension in the clips 698, 700 provides a gripping fit between the rail 634b and the lock bracket 702 on the torque tube 114 to generally retain the rails 634 in longitudinal position on the torque tube 114, while allowing for some loose sliding movement of the rails 634. A tool, such as plyers, is then used to further flex the clips 698, 700 inwards from the installation notches 706 to the lock notches 708, thereby increasing the tension in the clips 698, 700 and locking the rails 634 in position on the torque tube 114. The lock bracket 702 further includes first and second wings 704, 705, which extend at least partially along opposed side surfaces of the torque tube 114.

As shown in FIG. 19, each of the clips 698, 700 are independently removable from the lock bracket 702 and are able to be flexed into and out of engagement with the lock bracket 702. During installation, the rail 634b (shown in FIG. 18) is positioned along the torque tube 114 and the lock bracket 702 is manually held (e.g., by an operator) in alignment with the rail 634b while the clips 698, 700 are flexed into the installation notches 706 to engage the lock bracket 702. In other embodiments, the lock bracket 702 may be attached to one or more of the clips 698, 700. For example, in some embodiments, the lock bracket 702 includes a hinge (not shown) that hingedly attaches one of the clips 698, 700 to the lock bracket 702. In such embodiments, the tension in the clips 698, 700 is adjusted by adjusting the position of the other one of the clips 698, 700, such as by flexing the clip that is not attached to the lock bracket 702 to engage one of the notches 706, 708.

Figure 20A:
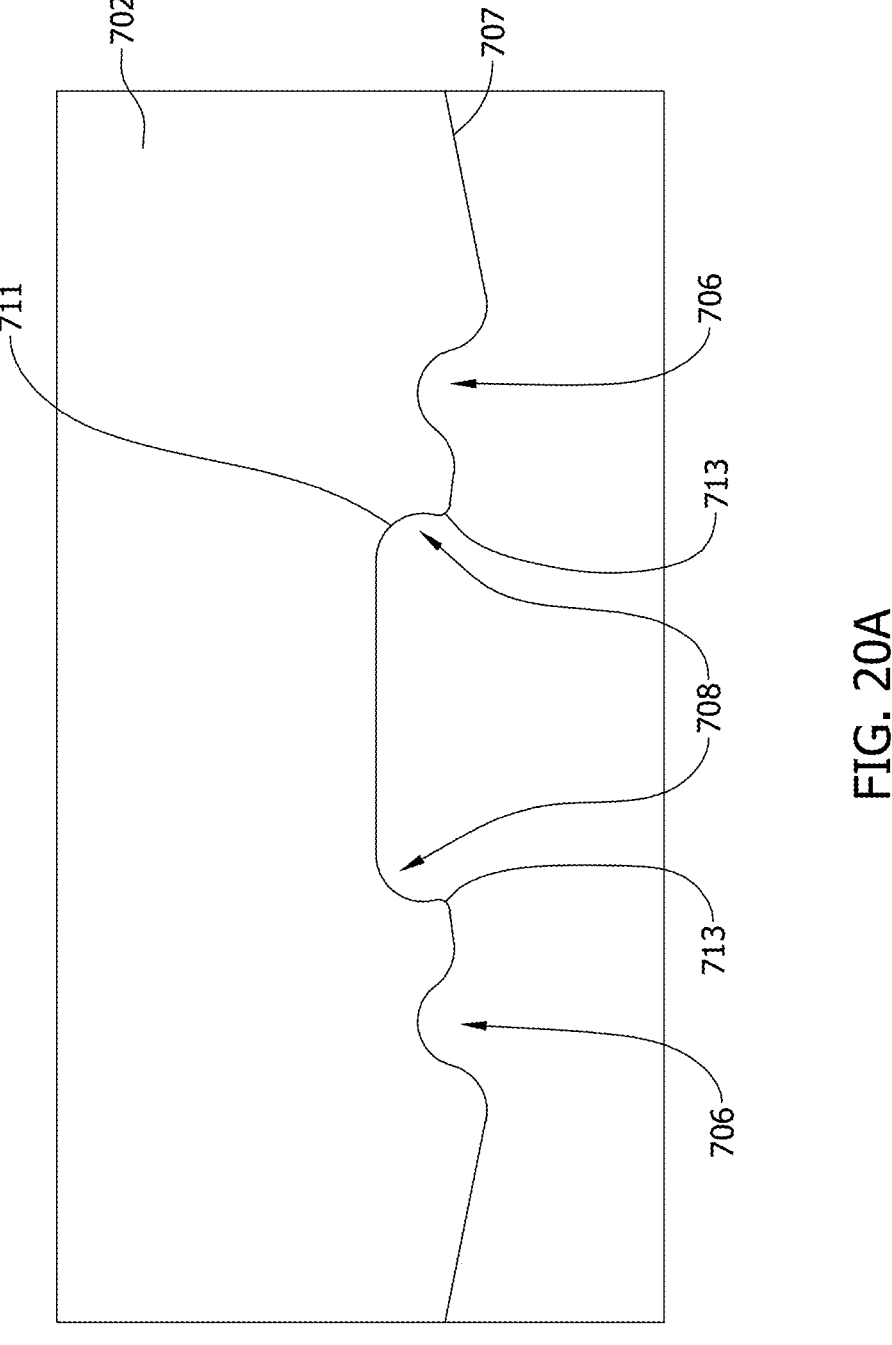
FIG. 20A is a side view of a portion of the lock bracket shown in FIG. 19.

Referring to FIG. 19, the lock bracket 702 includes two lock edges 707 which extend between the opposed wings 704, 705 and define the installation notches 706 and the lock notches 708. Each of the lock edges 707 are substantially identical to one another. Referring to FIG. 20A, the lock edge 707 includes a pair of lock notch sections 711 which contact the respective clips 698, 700 (FIG. 19) when the clips 698, 700 are received in the lock notches 708. The lock notch sections 711 each have a generally concave curvature and include radial projections 713 at lower ends of the lock notch sections 711 that project radially inward on the lock bracket 702 (i.e., towards the center of the page in FIG. 20A). That is, the concave curvature of the lock notch sections 711 arcs at least partially radially inward at the radial projections 713. When the clips 698, 700 are received within the lock notches 708, the tension in the clips 698, 700 biases the clips 698, 700 radially outwards of the lock notches 708. The radial projections 713 retain the clips 698, 700 in the lock notches 708 against shifting forces on the clips 698, 700 that may occur during use, such as from environmental forces acting on the panels or during tracking operations.

Figure 20B:
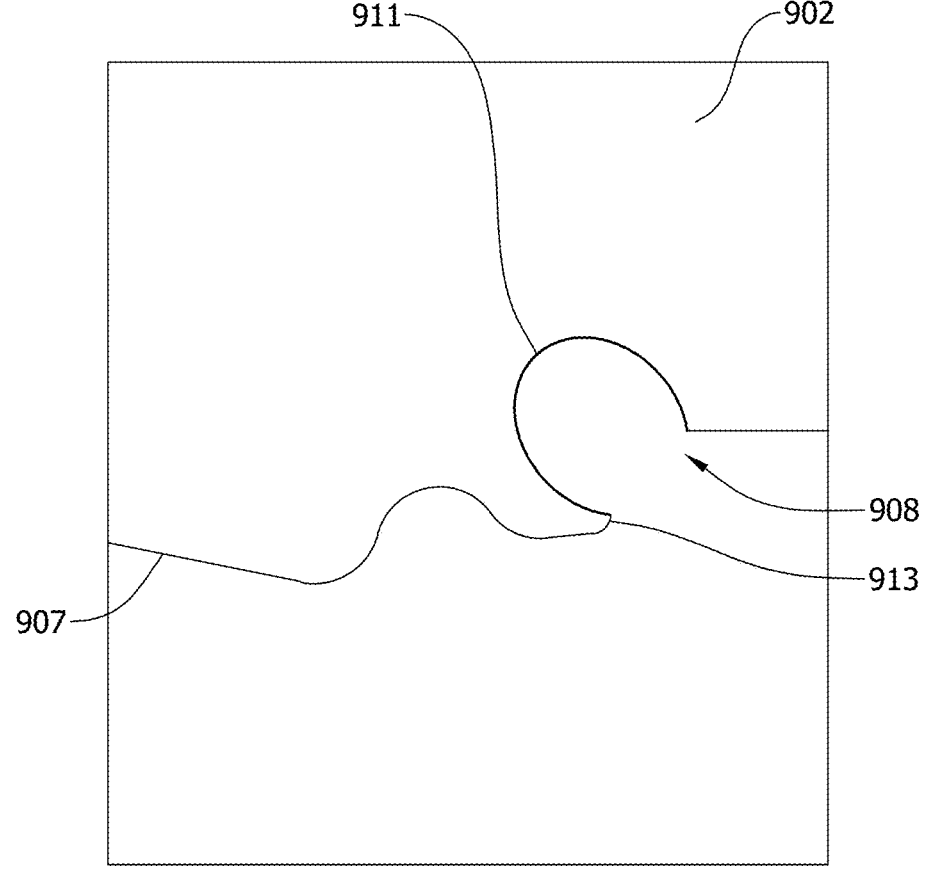
FIG. 20B is a side view of a portion of an alternative lock bracket for use with the rail connector of FIG. 19.

FIG. 20B shows a portion of an alternative lock bracket 902 for use with the rail connector 136 (shown in FIG. 9) or the rail connector 636 (shown in FIG. 19). The lock bracket 902 shown in FIG. 20B is substantially the same as the lock bracket 702 of FIG. 20A except that, in FIG. 20B, the lock notch 908 is deepened on the lock bracket 902, providing for a sharper point radial projection 913. In particular, as shown in FIG. 20B, the lock notch section 911 of the lock edge 907 extends along an arc that subtends an angle greater than 180 degrees or even greater than 270 degrees. As a result, when one of the clips 698, 700 (shown in FIG. 19) is received in the lock notch 908, the lock notch section 911 extends greater than 180 degrees and/or greater than 270 degrees around a circumference of the clip 698, 700. The recessed positioning of the lock notch 908 provides improved retention of the clip 698, 700 in the lock notch 908 during use.

The rail connectors 136 (shown in FIG. 13) and 636 (shown in FIG. 19) of the present disclosure allow for a quality check of the secured attachment of the rail 634b to the torque tube 114 to be performed by a visual inspection. For example, referring to FIG. 17, the panel assemblies 104a, 104b may be rotated into a position, during tracking or set into a position for the quality check, such that the lock bracket 702 and clips 698, 700 are visible at an eye-level of an operator. The operator may then walk down the row 102 (shown in FIG. 1A) and visually observe whether each of the clips 698, 700 are positioned in the lock notches 708 (shown in FIG. 20A). Any connectors that are missing a clip 698, 700 in a lock notch 708 may be corrected by the operator or otherwise flagged for service. Additionally, or alternatively, an at least partially autonomous device having a camera, such as an aerial drone, may be used to perform the quality check. Such a device may be particularly useful for solar arrays having large numbers of rows 102. The drone may be piloted along the backsides 106 of the rows 102 with the camera positioned at the respective lock brackets 702. An operator reviewing video feed captured by the drone then confirms whether any of the rail connectors 636 has a malfunction, such as a loose and/or missing clip 698, 700. Alternatively, the captured video feed may be reviewed at least partially autonomously, such as through the use of image detection software.

Figure 21:
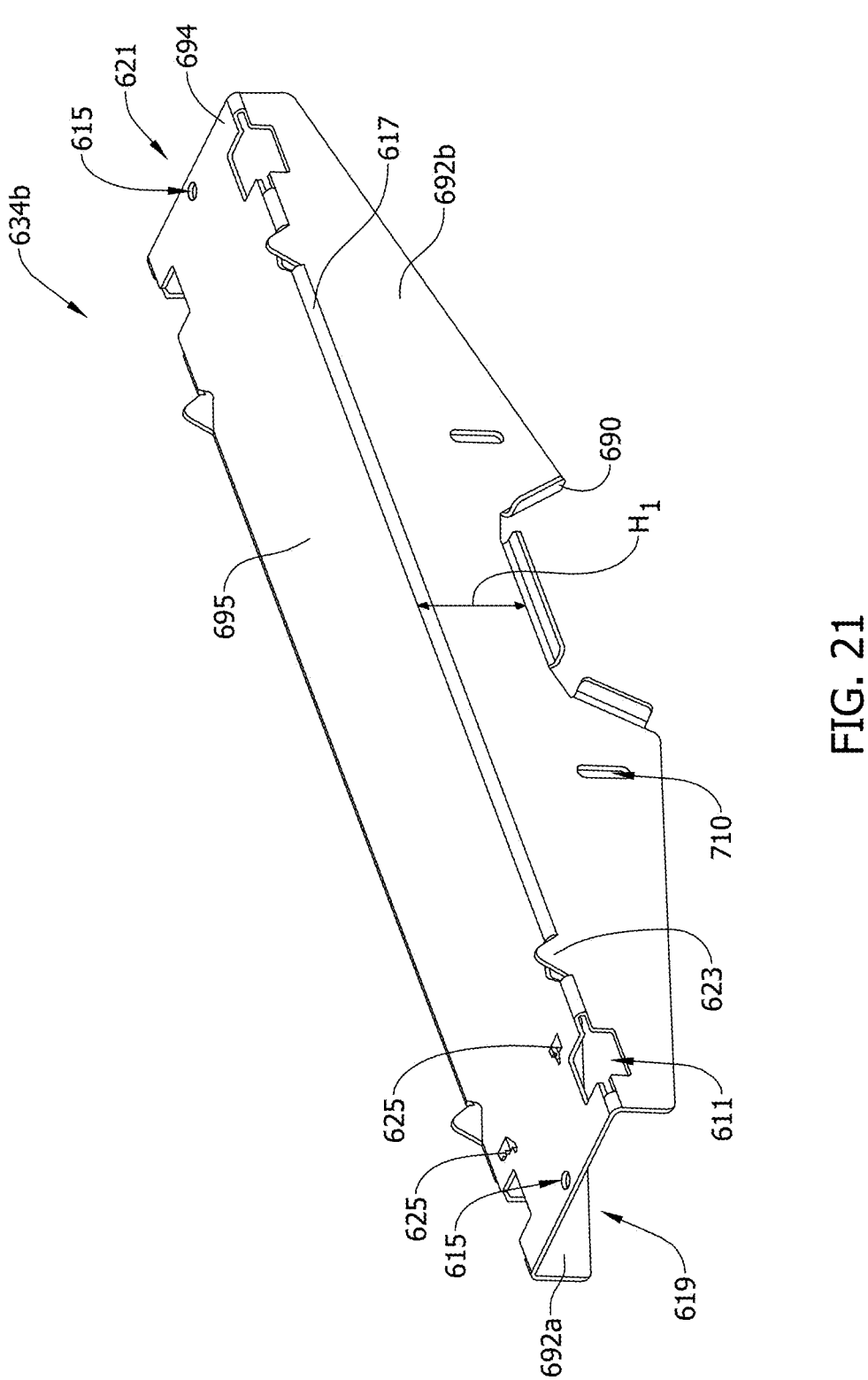
FIG. 21 is a perspective view of the rail shown in FIG. 16.

FIG. 21 is a perspective view of the rail 634b shown in FIGS. 16-18. As shown, the rail 634b of the example embodiment is formed as a single piece structure (e.g., without the use of removable attachment hardware such as nuts or bolts). The rail 634b further includes a first transverse end 619 and a second opposed transverse end 621. When positioned on the torque tube 114 (shown in FIG. 18), the rail 634b extends transversely of the longitudinal axis $L_1$ between the first and second ends 619, 621. The rail 634b includes three saddle flanges 690 on each of the sidewalls 692a, 692b (only the saddle flanges 690 on the second sidewall 692b are shown in FIG. 21) which extend longitudinally outward from the respective sidewalls 692a, 692b. Each of the saddle flanges 690 contact a different one of the side surfaces of the torque tube 114, as shown in FIG. 18. Thus, as shown in FIG. 18, the rail 634b has a shape which naturally orients the rail 634b orthogonally on the torque tube 114 (i.e., orthogonally relative to the longitudinal axis $L_1$) when the rail 634b is seated on the torque tube 114.

Referring to FIG. 21, the rail 634b defines an extension height $H_1$ extending from a top of the saddle flange 690 to a mounting surface 695 on the mounting wall 694 of the rail

634b. The extension height $H_1$ defines the distance the mounting surface 695 is positioned relative to the torque tube 114 (FIG. 18), when the rail 634b is seated on the torque tube 114. In the example of FIG. 21, the rail 634b has an increased extension height $H_1$ relative to an extension height $H_2$ of the rail 134 shown in FIG. 12. The increased extension height $H_1$ suitably allows for the attachment of bifacial solar panels that have photovoltaic cells on both sides of the panels. For example, the increased extension height $H_1$ positions the panels at a greater distance from the torque tube 114, thereby reducing shading from the torque tube 114 from obstructing light received on a back side 106 (shown in FIG. 7) of a bifacial panel. In the example, the extension height $H_1$ is 45 millimeters.

Referring back to FIG. 21, the rail 634b further defines attachment holes 615 at each of the first and second ends 619, 621. The attachment holes 615 are suitably sized and positioned to receive an attachment to the rail 634b thereon. In one example, a wire hook (not shown) may be attached to the rail 634b through a fastener or another removable connector. The wire hook may be used for cable management of the solar tracker system 100 by securing wiring extending along a length of the torque tube 114 (FIG. 16). In other embodiments, the attachment holes 615 may be defined at any position on the rail 634b. For example, in some embodiments the attachment holes 615 are defined in either one of the first and second sidewalls 692a, 692b. Positioning the attachment holes 615 at a lower location on the rails 634 may be advantageous for cable management by keeping the wiring closer to the torque tube 114 to avoid tangling or interference with other portions of the solar tracker system 100.

Referring to FIG. 21, the rail 634b further includes slide guides 623 projecting upwards from the first and second sidewalls 692a, 692b. The slide guides 623 are formed as cutouts of portions of the curved edge 617 and the mounting wall 694, though in other embodiments the slide guides 623 may be formed by welding or any other suitable process. Two slide guides 623 are included on each of the first and second sidewalls 692a, 692b, with one of the two slide guides 623 being positioned near the first end 619 of the rail 634b and the other of the slide guides 623 being positioned adjacent the second end 621 of the rail 634b. In total, the rail 634b includes four slide guides 623, each of which are sized and shaped substantially identical to one another. The slide guides 623 are used during installation to guide the panel assemblies 104a, 104b (FIG. 18) by restricting longitudinal movement and maintaining proper alignment of the panels as the panels are slid onto the rails 634. The slide guides 623 each have a rounded triangle shape. In other embodiments, the slide guides 623 may have any suitable shape that serves as an installation guide to the panel assemblies 104a, 104b as described herein. For example, in some embodiments, the slide guides 623 may be a single lip that extends near or along the curved edge 617 continuously along a substantial length of the rail 634b.

Referring to FIG. 21, the rail 634b further includes a pair of hooks 625 extending upwards from the mounting surface 695 proximate the first end 619. The hooks 625 are formed as cutouts of the mounting wall 694, though in other embodiments the hooks 625 may be formed by welding or any other suitable process. The hooks 625 are configured to extend through the lip apertures 414 (shown in FIG. 24) defined in the panel assemblies 104a, 104b to engage the panel assemblies 104a, 104b during installation, as described in greater detail below.

In the example, the rails 634 are made of a sheet metal and are assembled by a process punching the sheet metal to form the hooks 625, slide guides 623, clip openings 611, slots 710, and/or saddle flanges 690. The process also includes cutting the sheet metal from a roll of the sheet metal and stamping the cut sheet metal to form the shape of the rail 634b as shown in FIG. 21. In other embodiments the rails 634 may be formed by a "cold-form-rolled" process.

Figure 22:
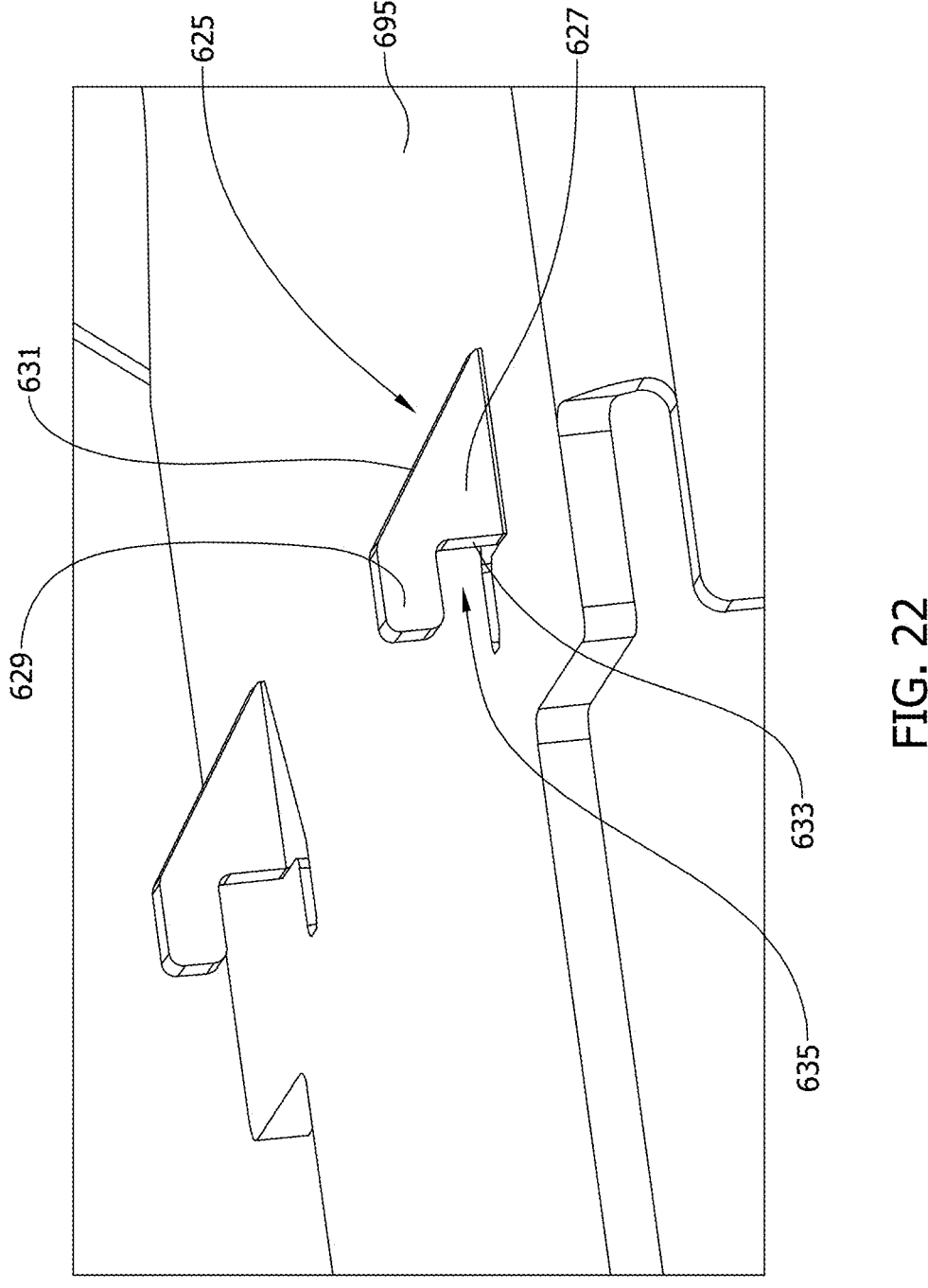
FIG. 22 is an enlarged view of a portion of the rail shown in FIG. 21.

Referring to FIG. 22, the hooks 625 each include a body portion 627 and a head portion 629 extending towards the first end 619 (shown in FIG. 21) from the body portion 627. The body portion 627 has a triangular shape and includes a ramp surface 631 that extends obliquely upward from the mounting surface 695. The body portion 627 also includes a hook surface 633 that extends generally vertically upward from the mounting surface 695 and to the head portion 629. The head portion 629 and the body portion 627 collectively define a notch 635 therebetween.

Figure 23:
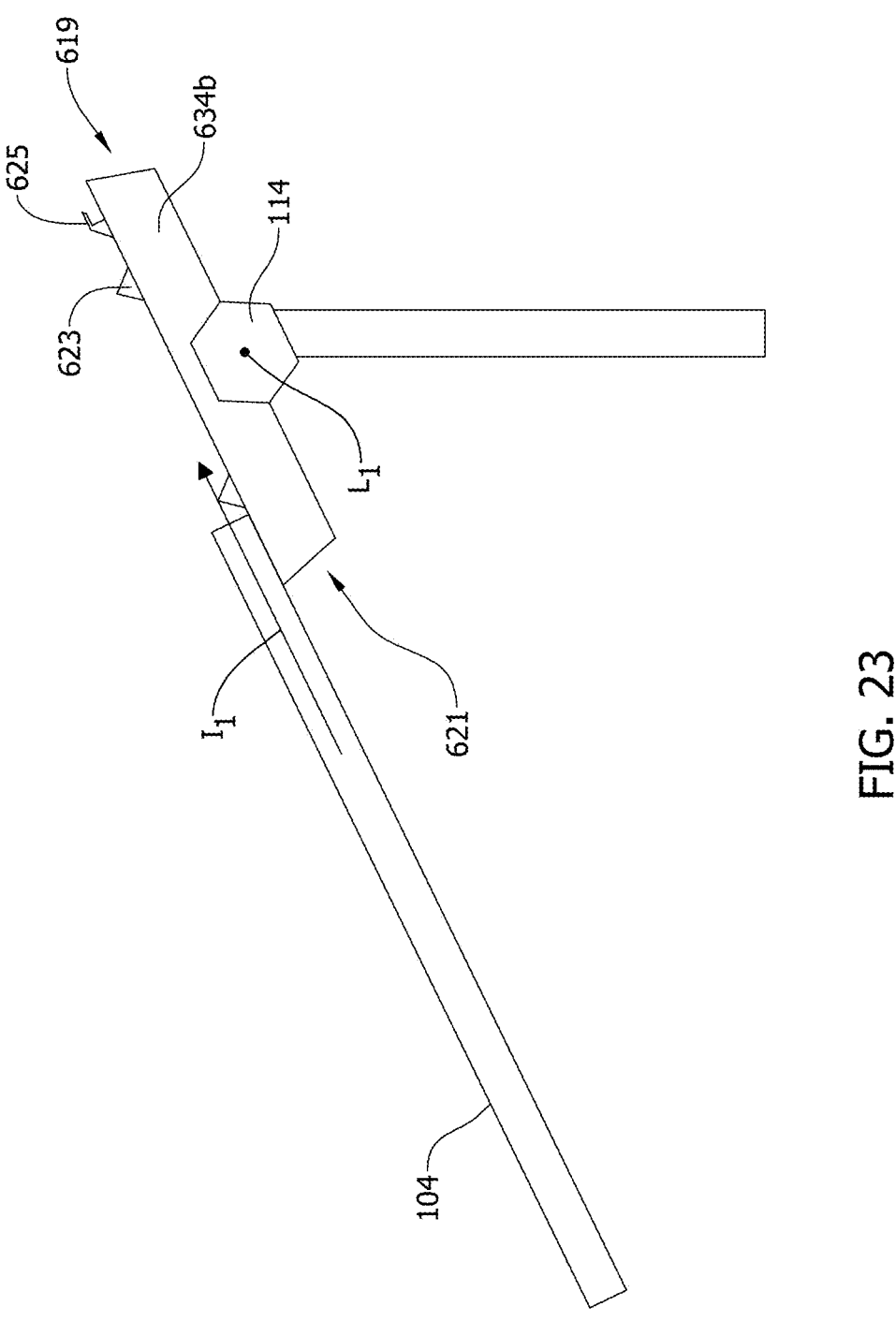
FIG. 23 is a schematic showing a first step in installing a panel assembly on the rail shown in FIG. 16.
Figure 24:
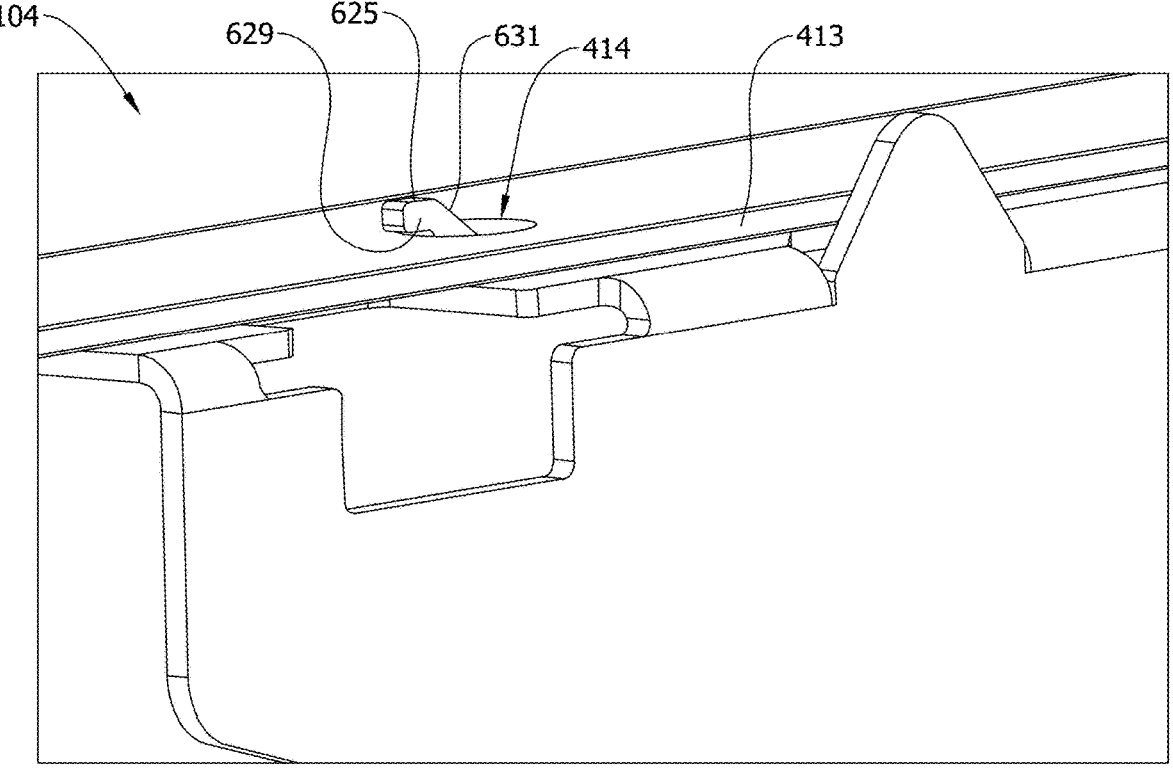
FIG. 24 is an enlarged perspective view showing a second step in installing the panel assembly on the rail shown in FIG. 16.

FIGS. 23-25 show steps of installing a panel assembly 104 on the rail 634b shown in FIGS. 16-22. Referring to FIG. 23, at a first step the torque tube 114 is rotated to an install position, in which the first ends 619 of the rails 634 are positioned vertically above the respective second ends 621. As an example, the panels may be oriented at a forty-degree angle to a plane extending through the longitudinal axis $L_1$. The panel assembly 104 is then positioned on the second end 621 with a lip 413 of the panel 104 (shown in FIG. 18) contacting slide guides 623 of opposed rails 634. While only one rail 634 supporting the panel assembly 104 is visible in FIG. 23, it should be understood that the panel assembly 104 is loaded on two adjacent rails 634 simultaneously in substantially the same manner. The panel 104 is then slid along the rails 634 in the install direction $I_1$ shown in FIG. 23 until the hooks 625 on the opposed rails 634 are aligned with and catch the lip apertures 414 on the panel assemblies 104a, 104b, as shown in FIG. 24. As the panel assembly 104 is slid along the rails 634, the ramp surface 631 of the hooks 625 raise the panel above the head portions 629. The panels are then hung on the hooks 625 by gravity with the lips 413 being received in the notches 635 (FIG. 22) of the hooks 625, as shown in FIG. 24.

FIG. 25 is a cross sectional view of the solar tracker system 100 taken along the longitudinal axis $L_1$ (FIG. 16) and shows a third step of the installation. Referring to FIG. 25, after the panels 104a, 104b are hung on the hooks 625, the cinch clips 605 are installed to couple the panel assemblies 104a, 104b to the rails 634. The cinch clips 605 are inserted into clip openings 611 (FIG. 21) on the rails 634 and forced inward (e.g., using a hammer or other tool) to clamp the panel assemblies 104a, 104b to the rail 634b. The hooks 625 on the rails 634 maintain alignment of the panels on the rails 634 during installation of the clips 698, 700.

Figure 26:
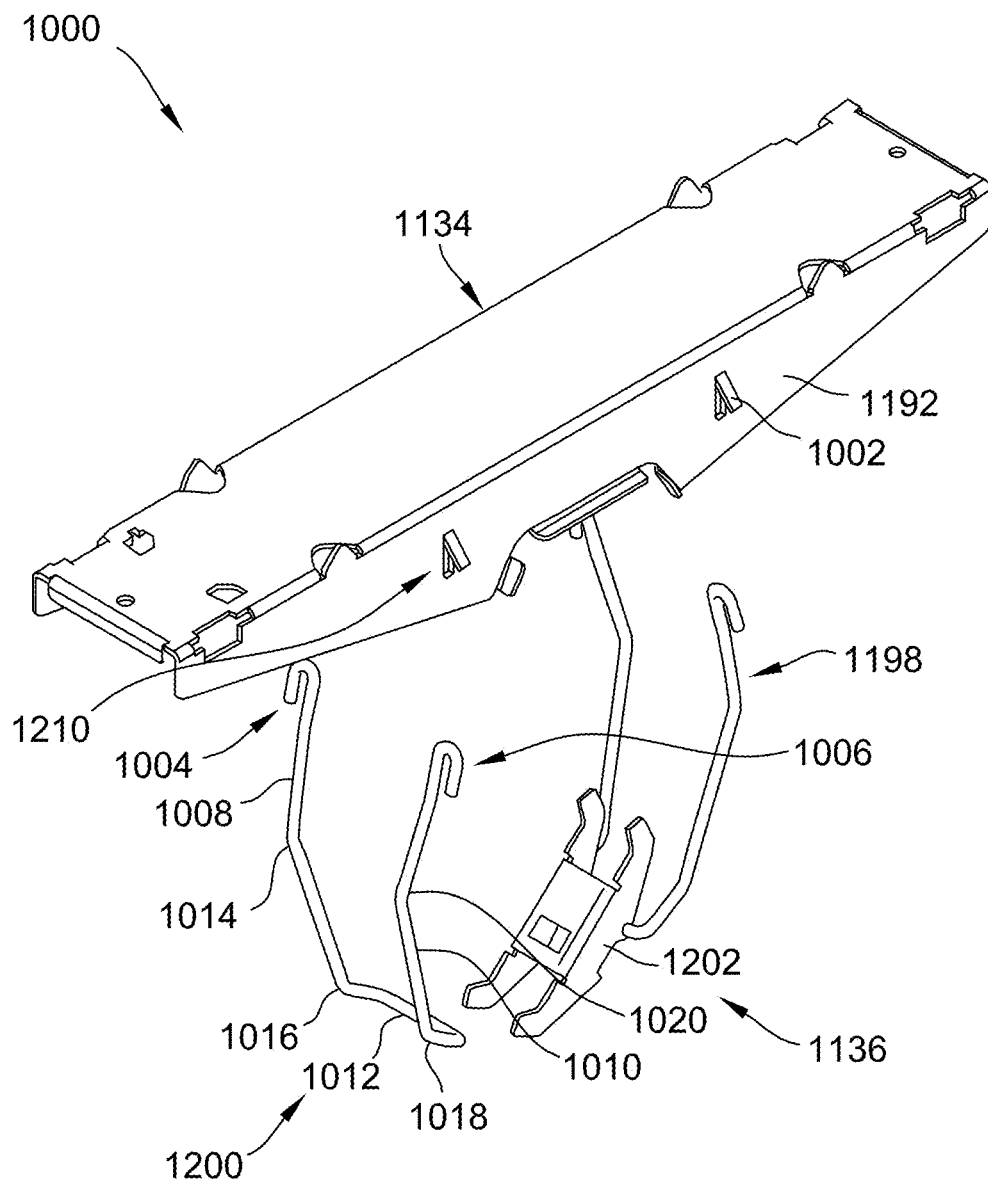
FIG. 26 is perspective view showing an alternative rail assembly for use with the solar tracker system shown in FIG. 1.
Figure 27:
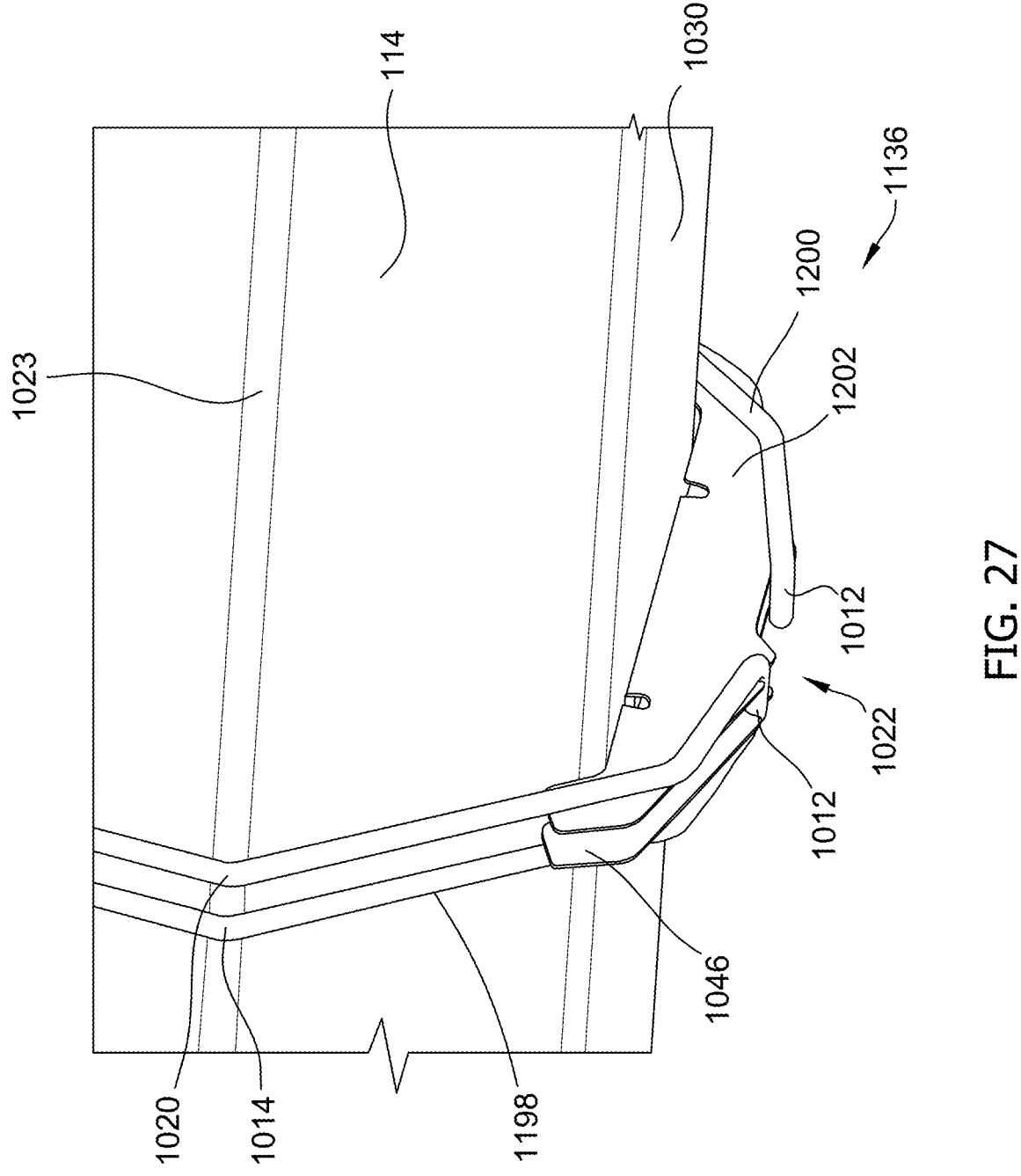
FIG. 27 is an enlarged perspective view of the rail assembly shown in FIG. 26 positioned on the torque tube shown in FIG. 2.

FIGS. 26-30 show an alternative rail assembly 1000 that includes an alternative rail 1134 and rail connector 1136 for mounting the rail 1134 to the torque tube 114, shown in FIG. 27. The alternative rail 1134 and rail connector 1136 are substantially similar to the rail 634b, shown in FIG. 21, and the rail connector 636, shown in FIGS. 18-20A, except as otherwise described differently below. In other embodiments the rail connector 1136 may be used in combination other rails, such as at least any one of the other rails 134, 434, 634, described herein.

Referring to FIG. 26, the rail connector 1136 includes a first clip 1198, a second clip 1200, and a lock bracket 1202. The rail 1134 includes slots 1210 sized to receive portions of the first and second clip 1198, 1200 therein in substantially the same manner as rail 634 having slots 710 (shown in FIG.

21). In contrast with the rail 634, the rail 1134 further includes clip arresters 1002 for each slot 1210. The clip arresters 1002 are flexible flaps in the sidewall 1192 of the rail 1134 that are cut on three sides with respect to the sidewall 1192 to enable the arresters 1002 to flex between an outward position, as shown in FIG. 26, and an inward position (not shown) in which the arresters 1002 are substantially coplanar with the sidewall 1192. In the outward position, the clip arresters 1002 provide clearance for the first clip 1198 and second clip 1200 to be positioned through the slots 1210 for attachment to the rail 1134. In the inward position, the clip arresters 1002 at least partially reduce the open area of the slots 1210 and restrict movement of the first clip 1198 and the second clip 1200 within the slots 1210 (i.e., in up and down directions in FIG. 26).

The first clip 1198 and second clip 1200 each include a pair of opposed first and second distal end hooks 1004, 1006 that attach to rail 1134 through the slots 1210 in the sidewall 1192. The clips 1198, 1200 further include a first shaft section 1008, a second shaft section 1010 and a central section 1012 connecting the first shaft section 1008 and the second shaft section 1010. The first shaft section 1008 extends from the first distal end hook 1004 to the central section 1012. The central section 1012 is oriented generally perpendicular to the first shaft section 1008 and the second shaft section 1010 and extends from the first shaft section 1008 to the second shaft section 1010. The second shaft section 1010 extends from the central section 1012 to the second distal end hook 1006.

The first shaft section 1008 and the second shaft section 1010 are each sized and shaped identically such that the clips 1198, 1200 are generally symmetrical about the central section 1012. The first shaft section 1008 includes a first bend 1014 and a second bend 1016 spaced from the first bend 1014. The second shaft section 1010 includes a third bend 1018 and a fourth bend 1020 spaced from the third bend 1018. As shown in FIG. 27, the first bend 1014 and fourth bend 1020 are positioned in correspondence with one of the vertices 1023 of the torque tube 114, such that the clips 1198, 1200 bend around the outer surfaces of the hexagonal profile of the torque tube 114.

Referring to FIG. 27, one respect in which the lock bracket 1202 of FIG. 26 differs from the lock bracket 702 (shown in FIG. 19) is that the lock bracket 1202 is shaped to be fixedly attached with at least one of the first clip 1198 and the second clip 1200. In FIG. 27, the first clip 1198 is fixedly attached to the lock bracket 1202 and the second clip 1200 is releasably connected to the lock bracket 1202. Specifically, the central section 1012 of the first clip 1198 is received in a press-fit within an attachment notch 1022 of the lock bracket 1202 and the central section of the second clip 1200 is releasably received in a lock notch 1208 (shown in FIG. 28). In other embodiments, the first clip 1198 may be attached to the lock bracket 1202 by any suitable interference fit, friction fit, a hinged connector, a fastener, or through any other suitable attachment.

Figure 28:
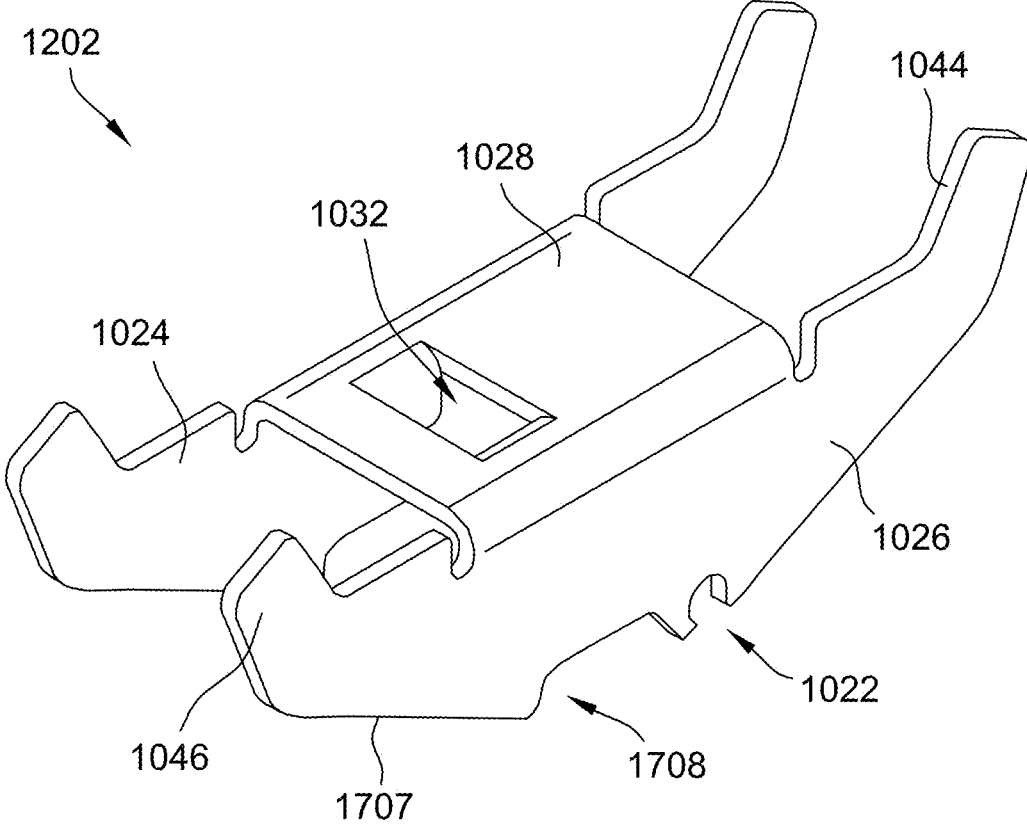
FIG. 28 is a perspective view of a lock bracket of the rail assembly shown in FIG. 26.
Figure 29:
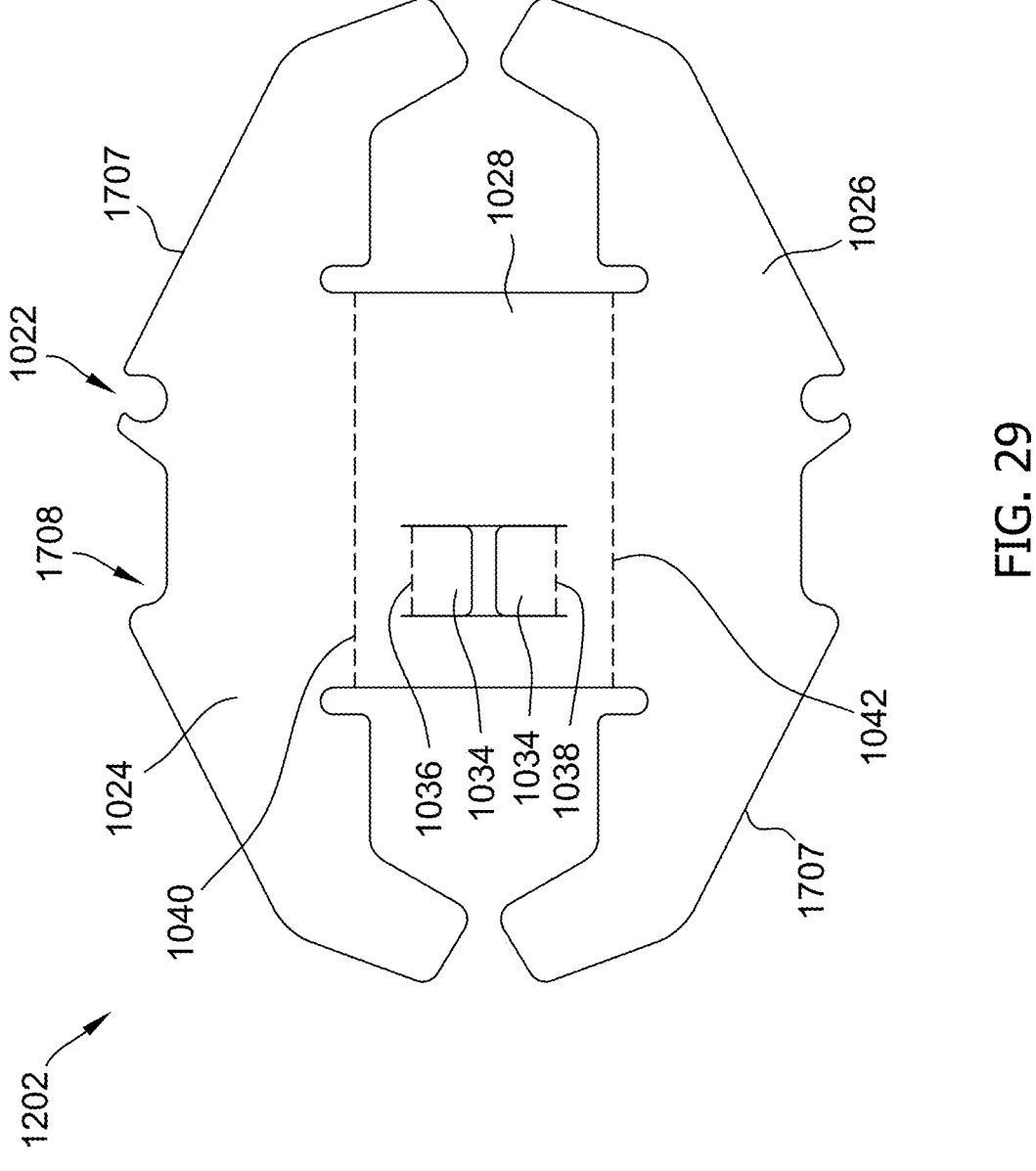
FIG. 29 is a flattened view of the lock bracket shown in FIG. 28.
Figure 30:
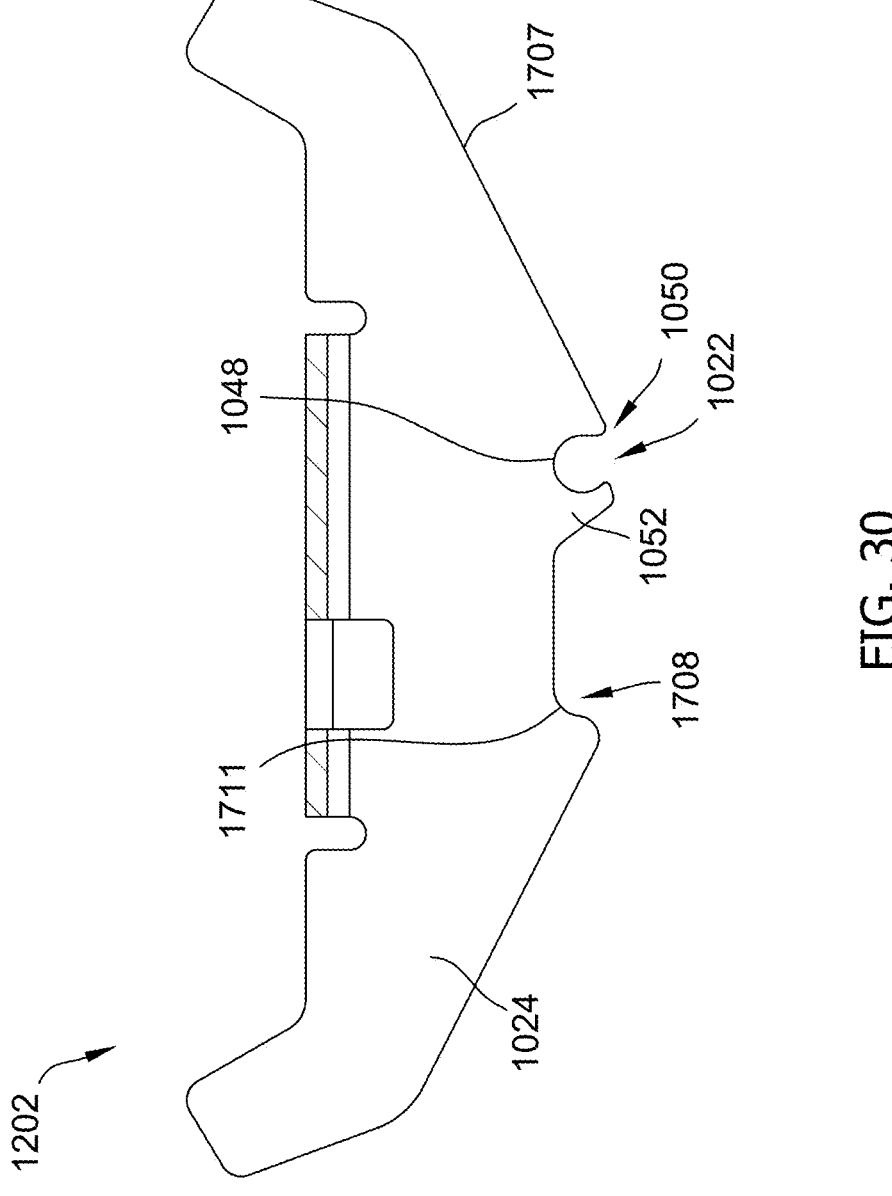
FIG. 30 is a cross section view of the lock bracket shown in FIG. 28.

FIG. 28 is a perspective view of the lock bracket 1202. FIG. 29 is a flattened view of the lock bracket 1202. FIG. 30 is a sectional view of the lock bracket 1202.

Referring to FIG. 28, the lock bracket 1202 includes a first sidewall 1024, a second sidewall 1026, and a connecting wall 1028 extending from the first sidewall 1024 to the second sidewall 1026. The connecting wall 1028 is positioned to contact at least one side and/or side surface of the torque tube 114, such as a lower most surface 1030 of the torque tube 114 as shown in FIG. 27. The connecting wall 1028 defines an opening 1032 therein that is formed by bending flaps 1034, as shown in FIG. 29, inward (i.e., into the page in FIG. 29) along the bend lines 1036, 1038.

Referring to FIG. 28, the first sidewall 1024 and second sidewall 1026 each depend from the connecting wall 1028 and are shaped and sized identically with one another such that the sidewalls 1024, 1026 are symmetrically arranged about the connecting wall 1028. The sidewalls 1024, 1026 are each oriented generally perpendicular to the connecting wall 1028 and are formed by bending the sidewalls 1024, 1026 inward along the bend lines 1040, 1042, as shown in FIG. 29.

The sidewalls 1024, 1026 each include an inner edge 1044 that is shaped to contact one or more sides of the torque tube 114 when the lock bracket 1202 is installed. Referring to FIG. 27, the inner edge 1044 contacts three sides of the torque tube 114. In particular, the sidewalls 1024, 1026 each include fingers 1046 on opposed ends of the sidewalls 1024, 1026 that extend above the connecting wall 1028 and around opposed sides of the torque tube 114, as shown in FIG. 27.

Referring to FIG. 28, the sidewalls 1024, 1026 each include an outer edge 1707 (also referred to herein as a "lock edge") that faces away from the torque tube 114 when the lock bracket 1202 is connected to the torque tube 114, as shown in FIG. 27. The outer edges 1707 define a lowermost boundary of the lock bracket 1202 and are substantially identical to one another.

Referring to FIG. 29, the outer edges 1707 of the first and second sidewalls 1024, 1026 each define an attachment notch 1022 and a lock notch 1708 thereon. As shown in FIG. 30, the outer edge 1707 includes a lock notch section 1711 which contacts the second clip 1200 (shown in FIG. 27) when the second clip 1200 is received in the lock notch 1708. The lock notch section 1711 has a generally concave curvature. In other embodiments, the lock notch section 1711 may include one or more radial projections, such as radial projections 713 shown in FIG. 20A.

The outer edge 1707 further includes an attachment notch section 1048 which contacts the first clip 1198 (shown in FIG. 27) when the first clip 1198 is received in the attachment notch 1022. The attachment notch 1022 has a generally semicircular profile such that the attachment notch 1022 defines an opening 1050 that is smaller than a length of a diameter of the attachment notch 1022. The sidewall 1024 further includes a retainer 1052 that at least partially defines the opening 1050. The retainer 1052 retains the first clip 1198 within the attachment notch 1022 even when the second clip 1200 is separated from the lock bracket 1202, such as prior to installing the rail 1134 on the tube 114. During manufacture, the retainer 1052 is flexed to provide clearance at the opening 1050 to receive the first clip 1198 therein and the first clip 1198 is press-fitted into the attachment notch 1022.

Referring back to FIGS. 26 and 27, the first clip 1198 and the second clip 1200 each attach to the rail 1134. The first clip 1198 is attached to lock bracket 1202 by press fitting the central section 1012 of the first clip 1198 into the attachment notch 1022. In some embodiments, the first clip 1198 is fixedly attached to the lock bracket 1202 during manufacture of the rail assembly 1000 and prior to assembling the solar array row 102 (shown in FIG. 1A) in the field. As a result, the rail connector 1136 of FIGS. 26-30 provides an improved ease of use during assembly by reducing loose components of the rail connector.

To mount the rail 1134 during assembly, the rail 1134 is seated on the torque tube 114 (e.g., as shown in FIG. 12) with the lock bracket 1202 connected to the rail 1134 by attachment to the first clip 1198. The lock bracket 1202 is positioned on the lower side 1030 of the torque tube 114 and the second clip 1200 is moved into the lock notch 1708 (shown in FIG. 28). When the clips 1198, 1200 are received within the lock notch 1708 and attachment notch 1022, respectively, the tension in the clips 1198, 1200 biases the clips 1198, 1200 radially outwards of the notches 1022, 1708. The rail connector 1136 facilitates securing the rail 1134 on the torque tube 114 without the use of threaded fasteners (e.g., nuts, bolts, screws, etc.). In other words, no threaded fasteners are used to secure the rail 1134 on the torque tube 114 and the rail 1134 is instead held in position by a clamping force applied on the torque tube 114 by the rail 1134 and the lock bracket 1202 due to the tension in the clips 1198, 1200.

The terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment (s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A rail assembly for connecting a photovoltaic (PV) panel to a tube, the rail assembly comprising:

a rail shaped to be mounted on the tube and to extend transversely outward of the tube between first and second ends when mounted on the tube; and a rail connector for securing the rail to the tube, the rail connector including:

a first clip including a first pair of distal end hooks attaching the first clip to the rail and a first central section connecting the first pair of distal end hooks;

a second clip including a second pair of distal end hooks attaching the second clip to the rail and a second central section connecting the second pair of distal end hooks; and a lock bracket defining a notch shaped to releasably receive the second central section of the second clip, the first central section of the first clip being attached to the lock bracket, wherein, when the rail is secured to the tube, the first clip and the second clip collectively apply tension on the lock bracket to clamp the rail to the tube.

2. The rail assembly of claim 1, wherein the lock bracket includes an outer edge defining the notch.

3. The rail assembly of claim 2, wherein the outer edge includes a lock notch section defining the notch and an attachment notch section defining an attachment notch, the first clip being received within the attachment notch.

4. The rail assembly of claim 3, wherein the lock bracket includes a retainer at least partially defining an opening to the attachment notch, wherein the retainer retains the first clip within the attachment notch when the second clip is released from the lock bracket.

5. The rail assembly of claim 1, wherein the first clip is in a press fit attachment with the lock bracket, and wherein the first clip and the second clip are independently pivotably relative to the rail.

6. The rail assembly of claim 1, wherein the lock bracket includes a first sidewall, a second sidewall, and a connecting wall extending from the first sidewall to the second sidewall.

7. The rail assembly of claim 6, wherein, when the rail assembly is secured to the tube, the connecting wall contacts at least one side of the tube.

8. The rail assembly of claim 1, wherein, when the rail assembly is secured to the tube, the lock bracket is positioned circumferentially opposed to the rail on the tube.

9. The rail assembly of claim 1, wherein the lock bracket contacts opposed sides of the tube.

10. The rail assembly of claim 1, wherein at least one of the first clip and the second clip includes a bend that is positioned in correspondence with a vertex of the tube when the rail assembly is secured to the tube.

11. A solar tracker system comprising:
a rotatable tube defining a longitudinal axis;
a rail mounted on the rotatable tube, the rail extending transversely outward of the tube between first and second opposed ends;
a photovoltaic (PV) panel assembly attached to the rail; and
a rail connector for securing the rail to the tube, the rail connector including:
   a first clip including a first pair of distal end hooks attaching the first clip to the rail and a first central section connecting the first pair of distal end hooks;
   a second clip including a second pair of distal end hooks attaching the second clip to the rail and a second central section connecting the second pair of distal end hooks; and
   a lock bracket defining a notch shaped to releasably receive the second central section of the second clip, the first central section of the first clip being attached to the lock bracket, wherein, when the rail is secured to the tube, the first clip and the second clip collectively apply tension on the lock bracket to clamp the rail to the tube.

12. The solar tracker system of claim 11, wherein the lock bracket includes an outer edge defining the notch.

13. The solar tracker system of claim 12, wherein the outer edge includes a lock notch section defining the notch and an attachment notch section defining an attachment notch, the first clip being received within the attachment notch.

14. The solar tracker system of claim 13, wherein the lock bracket includes a retainer at least partially defining an opening to the attachment notch, wherein the retainer retains the first clip within the attachment notch when the second clip is released from the lock bracket.

15. The solar tracker system of claim 11, wherein the first clip is in a press fit attachment with the lock bracket.

16. The solar tracker system of claim 11, wherein the lock bracket includes a first sidewall, a second sidewall, and a connecting wall extending from the first sidewall to the second sidewall.

17. The solar tracker system of claim 16, wherein the connecting wall contacts at least one side of the tube.

18. A method of assembling a solar array comprising:
positioning a rail assembly on a rotatable tube, the rail assembly including a rail that extends transversely outward from the tube, the rail assembly further including a rail connector including a first clip including a first pair of distal end hooks attaching the first clip to the rail and a first central section connecting the first pair of distal end hooks, a second clip including a second pair of distal end hooks attaching the second clip to the rail and a second central section connecting the second pair of distal end hooks, wherein the rail connector further includes a lock bracket defining a notch and the first central section of the first clip is attached to the lock bracket; and
clamping the rail to the tube by positioning the second central section of the second clip in the notch of the lock bracket such that the first clip and the second clip collectively apply tension on the lock bracket.

19. The method of claim 18, wherein the first clip is attached to the lock bracket prior to assembling the solar array.

20. The method of claim 18 further comprising:
positioning at least one wall of the lock bracket in contact with one or more surfaces of the tube, wherein the clamping is performed with the at least one wall in contact with the one or more surfaces.

* * * * *